(12) United States Patent
Parkinson

(10) Patent No.: US 11,947,752 B2
(45) Date of Patent: Apr. 2, 2024

(54) CUSTOMIZING USER INTERFACES OF BINARY APPLICATIONS

(71) Applicant: RealWear, Inc., Vancouver, WA (US)

(72) Inventor: Christopher Iain Parkinson, Richland, WA (US)

(73) Assignee: RealWear, Inc., Vancouver, WA (US)

(*) Notice: Subject to any disclaimer, the term of this patent is extended or adjusted under 35 U.S.C. 154(b) by 0 days.

(21) Appl. No.: 17/880,093

(22) Filed: Aug. 3, 2022

(65) Prior Publication Data

US 2022/0374098 A1 Nov. 24, 2022

Related U.S. Application Data

(63) Continuation of application No. 16/007,773, filed on Jun. 13, 2018, now Pat. No. 11,507,216, which is a
(Continued)

(51) Int. Cl.
G06F 3/048 (2013.01)
G06F 3/01 (2006.01)
(Continued)

(52) U.S. Cl.
CPC ............ G06F 3/0416 (2013.01); G06F 3/012 (2013.01); G06F 3/017 (2013.01); G06F 3/0482 (2013.01);
(Continued)

(58) Field of Classification Search
CPC .......... G06F 3/167; G06F 3/017; G06F 3/013; G06F 3/011; G06F 3/012; G06F 1/163;
(Continued)

(56) References Cited

U.S. PATENT DOCUMENTS 4,944,361 A 7/1990 Lindgren et al.
5,046,192 A 9/1991 Ryder
(Continued)

FOREIGN PATENT DOCUMENTS

CN 101156104 A 4/2008
CN 201114708 Y 9/2008
(Continued)

OTHER PUBLICATIONS

"Andy Lowery on the Industrial Internet", Techonomy Media, p. 1 (Nov. 30, 2016).
(Continued)

Primary Examiner — Steven B Theriault
(74) Attorney, Agent, or Firm — Shook, Hardy & Bacon L.L.P.

(57) ABSTRACT

Aspects of the present invention facilitate the customization of binary application user interfaces without modification of the underlying source code. Embodiments described herein can provide for hands-free operation or accessibility services, such as touchless operation of compiled applications, with minimal intervention. Described embodiments can automatically interface with the touch-based operating system to generate hands-free commands that, when detected (e.g., voice detection), can cause corresponding touch-based commands to be executed. Embodiments can utilize audio inputs, by way of example, to facilitate hands-free interaction with the touch-based operating system and applications executing thereon.

16 Claims, 16 Drawing Sheets

Related U.S. Application Data continuation-in-part of application No. 15/390,191, filed on Dec. 23, 2016, now Pat. No. 10,620,910.

(51) Int. Cl.
| | |
|---|---|
| *G06F 3/041* | (2006.01) |
| *G06F 3/0482* | (2013.01) |
| *G06F 3/0484* | (2022.01) |
| *G06F 3/16* | (2006.01) |
| *G06F 8/38* | (2018.01) |
| *G06F 9/451* | (2018.01) |
| *G06F 3/04815* | (2022.01) |
| *G06F 3/0485* | (2022.01) |
| *G06F 3/0488* | (2022.01) |

(52) U.S. Cl.
CPC ............ *G06F 3/0484* (2013.01); *G06F 3/167* (2013.01); *G06F 8/38* (2013.01); *G06F 9/451* (2018.02); *G06F 3/04815* (2013.01); *G06F 3/0485* (2013.01); *G06F 3/0488* (2013.01)

(58) Field of Classification Search
CPC ............... G06F 3/04817; G06F 3/0482; G06F 3/04815; G06F 3/165; G06F 3/04883; G06F 3/16; G06F 3/04845; G06F 3/0485; G10L 15/02; G10L 15/00; H04R 5/033
See application file for complete search history.

(56) References Cited

U.S. PATENT DOCUMENTS

| | | | |
|---|---|---|---|
| 5,185,807 A | 2/1993 | Bergin et al. | |
| 5,572,343 A | 11/1996 | Okamura et al. | |
| 5,694,562 A | 12/1997 | Fisher | |
| 5,767,820 A | 6/1998 | Bassett et al. | |
| 5,796,374 A | 8/1998 | Cone et al. | |
| 5,796,404 A | 8/1998 | Gentner | |
| 5,806,079 A | 9/1998 | Rivette et al. | |
| 5,812,224 A | 9/1998 | Maeda et al. | |
| 5,815,126 A | 9/1998 | Fan et al. | |
| 5,850,211 A | 12/1998 | Tognazzini | |
| 5,882,137 A | 3/1999 | Epp et al. | |
| 5,977,935 A | 11/1999 | Yasukawa et al. | |
| 6,061,064 A | 5/2000 | Reichlen | |
| 6,114,978 A | 9/2000 | Hoag | |
| 6,115,686 A * | 9/2000 | Chung | G10L 13/08 704/E13.011 |
| 6,198,462 B1 | 3/2001 | Daily et al. | |
| 6,204,974 B1 | 3/2001 | Spitzer | |
| 6,222,583 B1 | 4/2001 | Matsumura et al. | |
| 6,222,677 B1 | 4/2001 | Budd et al. | |
| 6,352,228 B1 | 3/2002 | Buerklin | |
| 6,388,657 B1 | 5/2002 | Natoli | |
| 6,406,811 B1 | 6/2002 | Hall et al. | |
| 6,424,357 B1 * | 7/2002 | Frulla | G06F 3/038 715/728 |
| 6,434,250 B1 | 8/2002 | Tsuhako | |
| 6,456,262 B1 | 9/2002 | Bell | |
| 6,489,976 B1 | 12/2002 | Patil et al. | |
| 6,496,842 B1 | 12/2002 | Lyness | |
| 6,587,700 B1 | 7/2003 | Meins et al. | |
| 6,600,480 B2 | 7/2003 | Natoli | |
| 6,637,883 B1 | 10/2003 | Tengshe et al. | |
| 6,708,339 B1 | 3/2004 | Smith, Jr. | |
| 6,747,611 B1 | 6/2004 | Budd et al. | |
| 6,766,298 B1 * | 7/2004 | Dodrill | H04M 3/4938 704/235 |
| 6,867,752 B1 | 3/2005 | Yamazaki et al. | |
| 6,901,431 B1 * | 5/2005 | Dodrill | H04M 3/5307 704/E15.044 |
| 6,911,969 B1 | 6/2005 | Nelson et al. | |
| 7,103,841 B2 | 9/2006 | Ronkainen et al. | |
| 7,113,170 B2 | 9/2006 | Lauper et al. | |
| 7,124,425 B1 | 10/2006 | Anderson, Jr. et al. | |
| 7,134,094 B2 | 11/2006 | Stabb et al. | |
| 7,243,309 B2 | 7/2007 | Koay et al. | |
| 7,245,737 B2 | 7/2007 | Amae et al. | |
| 7,290,220 B2 | 10/2007 | Bhogal et al. | |
| 7,315,988 B2 | 1/2008 | Cragun et al. | |
| 7,353,464 B1 | 4/2008 | Kundu et al. | |
| 7,453,451 B1 | 11/2008 | Maguire, Jr. | |
| 7,613,292 B2 | 11/2009 | te Riet | |
| 7,661,074 B2 | 2/2010 | Sadler et al. | |
| 7,849,397 B1 | 12/2010 | Ahmed | |
| 7,853,050 B2 | 12/2010 | Wang et al. | |
| 7,928,926 B2 | 4/2011 | Yamamoto et al. | |
| 7,933,900 B2 | 4/2011 | Reddy et al. | |
| 7,962,344 B2 | 6/2011 | Sharpe et al. | |
| 8,051,105 B1 | 11/2011 | Johnson | |
| 8,065,620 B2 | 11/2011 | Chen et al. | |
| 8,378,924 B2 | 2/2013 | Jacobson et al. | |
| 8,432,400 B1 | 4/2013 | Weskamp | |
| 8,531,355 B2 | 9/2013 | Maltz | |
| 8,549,443 B2 | 10/2013 | Irvine | |
| 8,643,951 B1 | 2/2014 | Wheeler et al. | |
| 8,645,831 B2 | 2/2014 | Wang | |
| 8,667,421 B2 | 3/2014 | Grunberger | |
| 8,706,685 B1 | 4/2014 | Smith et al. | |
| 8,743,021 B1 | 6/2014 | Park et al. | |
| 8,751,969 B2 | 6/2014 | Matsuda et al. | |
| 8,788,271 B2 * | 7/2014 | James | G06F 9/451 704/275 |
| 8,855,719 B2 | 10/2014 | Jacobsen et al. | |
| 8,922,481 B1 | 12/2014 | Kauffmann et al. | |
| 8,929,589 B2 | 1/2015 | Publicover et al. | |
| 8,947,322 B1 | 2/2015 | Chi et al. | |
| 8,990,682 B1 | 3/2015 | Wong et al. | |
| 9,075,249 B2 | 7/2015 | Heinrich et al. | |
| 9,122,307 B2 | 9/2015 | Jacobsen et al. | |
| 9,134,793 B2 | 9/2015 | Mcdonald et al. | |
| 9,135,914 B1 | 9/2015 | Bringert et al. | |
| 9,158,115 B1 | 10/2015 | Worley et al. | |
| 9,164,588 B1 | 10/2015 | Johnson et al. | |
| 9,240,069 B1 | 1/2016 | Li | |
| 9,268,580 B2 | 2/2016 | Hampton et al. | |
| 9,285,872 B1 | 3/2016 | Raffle et al. | |
| 9,294,607 B2 | 3/2016 | Jacobsen et al. | |
| 9,298,970 B2 | 3/2016 | Wang et al. | |
| 9,301,085 B2 | 3/2016 | Parkinson et al. | |
| 9,377,852 B1 | 6/2016 | Shapiro et al. | |
| 9,377,862 B2 | 6/2016 | Parkinson et al. | |
| 9,442,631 B1 | 9/2016 | Patel et al. | |
| 9,500,867 B2 | 9/2016 | Hennelly et al. | |
| 9,477,888 B1 | 10/2016 | Lewis | |
| 9,530,410 B1 | 12/2016 | Lebeau et al. | |
| 9,588,593 B2 | 3/2017 | Li | |
| 9,658,451 B2 | 3/2017 | Kobayashi et al. | |
| 9,615,067 B1 | 4/2017 | Foote et al. | |
| 9,678,637 B1 | 6/2017 | Brothers et al. | |
| 9,690,763 B1 | 6/2017 | Lee | |
| 9,817,232 B2 | 11/2017 | Lindley et al. | |
| 9,823,742 B2 | 11/2017 | Parker et al. | |
| 9,904,369 B2 | 2/2018 | Lai et al. | |
| 9,913,302 B2 | 3/2018 | Parkinson et al. | |
| 9,916,006 B2 | 3/2018 | Maltz | |
| 9,922,254 B1 | 3/2018 | Ho et al. | |
| 9,940,754 B2 | 4/2018 | Kuribara et al. | |
| 9,946,079 B2 | 4/2018 | Ozeki | |
| 10,013,053 B2 | 7/2018 | Cederlund et al. | |
| 10,013,976 B2 | 7/2018 | Woodall et al. | |
| 10,048,750 B2 | 8/2018 | Du et al. | |
| 10,078,416 B2 | 9/2018 | Tsuda | |
| 10,082,863 B2 | 9/2018 | Kempinski | |
| 10,089,000 B2 | 10/2018 | Ott et al. | |
| 10,255,101 B2 | 4/2019 | Zielinski et al. | |
| 10,255,249 B1 | 4/2019 | Yu et al. | |
| 10,275,023 B2 | 4/2019 | Mckenzie et al. | |
| 10,288,908 B2 | 5/2019 | Calilung et al. | |
| 10,347,246 B2 | 7/2019 | Lee et al. | |
| 10,359,982 B2 | 7/2019 | Fuchikami et al. | |
| 10,402,242 B2 | 9/2019 | Kawabata et al. | |
| 10,540,064 B1 | 1/2020 | Chasin | |

(56) References Cited

U.S. PATENT DOCUMENTS

| | | | |
|---|---|---|---|
| 10,725,610 B2 | 7/2020 | Bastide et al. | |
| 10,740,976 B2 | 8/2020 | Short et al. | |
| 11,237,696 B2 | 2/2022 | Carbune et al. | |
| 2001/0040590 A1 | 11/2001 | Abbott et al. | |
| 2002/0010715 A1* | 1/2002 | Chinn | G06F 16/957 |
| | | | 715/236 |
| 2002/0015008 A1 | 2/2002 | Kishida et al. | |
| 2002/0026529 A1 | 2/2002 | Sugahara | |
| 2002/0037770 A1 | 3/2002 | Paul et al. | |
| 2002/0044152 A1 | 4/2002 | Abbott, III et al. | |
| 2002/0190947 A1 | 12/2002 | Feinstein | |
| 2003/0020707 A1 | 1/2003 | Kangas et al. | |
| 2003/0156130 A1 | 8/2003 | James et al. | |
| 2003/0158736 A1 | 8/2003 | James et al. | |
| 2003/0174170 A1 | 9/2003 | Jung et al. | |
| 2003/0182713 A1 | 10/2003 | Rolla | |
| 2003/0184585 A1 | 10/2003 | Lin et al. | |
| 2004/0008158 A1 | 1/2004 | Chi et al. | |
| 2004/0044958 A1 | 3/2004 | Wolf et al. | |
| 2004/0102971 A1 | 5/2004 | Lipscher et al. | |
| 2004/0218776 A1 | 11/2004 | Rolla | |
| 2004/0252119 A1 | 12/2004 | Hunleth et al. | |
| 2005/0015730 A1 | 1/2005 | Gunturi et al. | |
| 2005/0071171 A1 | 3/2005 | Dvorak | |
| 2005/0071172 A1 | 3/2005 | James | |
| 2005/0083248 A1 | 4/2005 | Biocca et al. | |
| 2005/0146488 A1 | 7/2005 | Travers et al. | |
| 2005/0273487 A1* | 12/2005 | Mayblum | H04L 67/75 |
| | | | 709/202 |
| 2006/0044265 A1 | 3/2006 | Min | |
| 2006/0048286 A1 | 3/2006 | Donato | |
| 2006/0074980 A1 | 4/2006 | Sarkar | |
| 2006/0085765 A1 | 4/2006 | Peterson et al. | |
| 2006/0206336 A1 | 9/2006 | Gurram et al. | |
| 2006/0274153 A1 | 12/2006 | Levien et al. | |
| 2006/0282784 A1 | 12/2006 | Taylor et al. | |
| 2007/0024507 A1 | 2/2007 | Kasamatsu et al. | |
| 2007/0052672 A1 | 3/2007 | Ritter et al. | |
| 2007/0130547 A1 | 6/2007 | Boillot | |
| 2007/0171193 A1 | 7/2007 | Nakamura | |
| 2007/0183616 A1 | 8/2007 | Wahl et al. | |
| 2007/0211023 A1 | 9/2007 | Boillot | |
| 2007/0220108 A1 | 9/2007 | Whitaker | |
| 2007/0220439 A1 | 9/2007 | Fukura et al. | |
| 2008/0276178 A1 | 11/2008 | Fadell et al. | |
| 2008/0288259 A1 | 11/2008 | Chambers et al. | |
| 2009/0077481 A1 | 3/2009 | Ishii | |
| 2009/0099836 A1 | 4/2009 | Jacobsen et al. | |
| 2009/0100732 A1 | 4/2009 | Seidler | |
| 2009/0128448 A1 | 5/2009 | Riechel | |
| 2009/0144321 A1 | 6/2009 | Shamma | |
| 2009/0154990 A1 | 6/2009 | Julliere | |
| 2009/0182562 A1 | 7/2009 | Caire et al. | |
| 2009/0195652 A1 | 8/2009 | Gal | |
| 2009/0300506 A1 | 12/2009 | Drucker et al. | |
| 2010/0036665 A1 | 2/2010 | Bess et al. | |
| 2010/0086278 A1 | 4/2010 | Stankiewicz et al. | |
| 2010/0138759 A1 | 6/2010 | Roy | |
| 2010/0194350 A1 | 8/2010 | Chatterjee et al. | |
| 2010/0241663 A1 | 9/2010 | Huang et al. | |
| 2010/0259471 A1 | 10/2010 | Takano et al. | |
| 2010/0315329 A1 | 12/2010 | Previc et al. | |
| 2010/0328204 A1 | 12/2010 | Edwards et al. | |
| 2011/0001699 A1 | 1/2011 | Jacobsen et al. | |
| 2011/0090135 A1 | 4/2011 | Tricoukes et al. | |
| 2011/0096036 A1 | 4/2011 | McIntosh et al. | |
| 2011/0199389 A1 | 8/2011 | Lu et al. | |
| 2011/0249122 A1 | 10/2011 | Tricoukes et al. | |
| 2011/0271224 A1 | 11/2011 | Cruz Moreno et al. | |
| 2012/0002046 A1 | 1/2012 | Rapoport et al. | |
| 2012/0019662 A1 | 1/2012 | Maltz | |
| 2012/0050143 A1 | 3/2012 | Border et al. | |
| 2012/0062444 A1 | 3/2012 | Cok et al. | |
| 2012/0068914 A1 | 3/2012 | Jacobsen et al. | |
| 2012/0086624 A1 | 4/2012 | Thompson et al. | |
| 2012/0096341 A1 | 4/2012 | Suga | |
| 2012/0114131 A1 | 5/2012 | Tricoukes et al. | |
| 2012/0151349 A1 | 6/2012 | Hahm et al. | |
| 2012/0192065 A1 | 7/2012 | Migos et al. | |
| 2012/0215543 A1 | 8/2012 | Oz et al. | |
| 2012/0235896 A1 | 9/2012 | Jacobsen et al. | |
| 2012/0235902 A1 | 9/2012 | Eisenhardt et al. | |
| 2012/0272179 A1 | 10/2012 | Stafford | |
| 2012/0272484 A1 | 11/2012 | Willborn | |
| 2012/0287284 A1 | 11/2012 | Jacobsen et al. | |
| 2012/0290964 A1 | 11/2012 | Lee et al. | |
| 2013/0007668 A1 | 1/2013 | Liu et al. | |
| 2013/0007672 A1 | 1/2013 | Taubman | |
| 2013/0007686 A1 | 1/2013 | Lu | |
| 2013/0018659 A1 | 1/2013 | Chi | |
| 2013/0021269 A1 | 1/2013 | Johnson et al. | |
| 2013/0047322 A1 | 2/2013 | Peebles | |
| 2013/0054576 A1 | 2/2013 | Karmakar et al. | |
| 2013/0069985 A1 | 3/2013 | Wong et al. | |
| 2013/0089214 A1 | 4/2013 | Tricoukes et al. | |
| 2013/0090062 A1 | 4/2013 | Tricoukes et al. | |
| 2013/0117105 A1 | 5/2013 | Dyor et al. | |
| 2013/0117111 A1 | 5/2013 | Dyor et al. | |
| 2013/0135353 A1 | 5/2013 | Wheeler et al. | |
| 2013/0147686 A1 | 6/2013 | Clavin et al. | |
| 2013/0169514 A1 | 7/2013 | Edwards et al. | |
| 2013/0174205 A1 | 7/2013 | Jacobsen et al. | |
| 2013/0187835 A1 | 7/2013 | Vaught et al. | |
| 2013/0194164 A1 | 8/2013 | Sugden et al. | |
| 2013/0230253 A1 | 9/2013 | Stankiewicz et al. | |
| 2013/0239000 A1* | 9/2013 | Parkinson | G06F 3/012 |
| | | | 715/728 |
| 2013/0241805 A1 | 9/2013 | Gomez | |
| 2013/0246050 A1* | 9/2013 | Yu | G10L 15/1822 |
| | | | 704/9 |
| 2013/0246920 A1 | 9/2013 | Fields et al. | |
| 2013/0246967 A1 | 9/2013 | Wheeler et al. | |
| 2013/0278631 A1 | 10/2013 | Border et al. | |
| 2013/0285886 A1 | 10/2013 | Pombo et al. | |
| 2013/0288753 A1 | 10/2013 | Jacobsen et al. | |
| 2013/0290882 A1* | 10/2013 | Cotte | H04N 21/42224 |
| | | | 715/764 |
| 2013/0307797 A1 | 11/2013 | Taguchi et al. | |
| 2013/0321255 A1 | 12/2013 | Lamb et al. | |
| 2013/0326208 A1 | 12/2013 | Jacobsen et al. | |
| 2014/0000015 A1 | 1/2014 | Arai | |
| 2014/0002341 A1 | 1/2014 | Nister et al. | |
| 2014/0002357 A1 | 1/2014 | Pombo et al. | |
| 2014/0028923 A1 | 1/2014 | Griffin et al. | |
| 2014/0035819 A1 | 2/2014 | Griffin | |
| 2014/0043214 A1 | 2/2014 | Park et al. | |
| 2014/0058733 A1 | 2/2014 | Voorhees et al. | |
| 2014/0092018 A1 | 4/2014 | Geithner | |
| 2014/0098132 A1 | 4/2014 | Fein et al. | |
| 2014/0111427 A1 | 4/2014 | Lindley et al. | |
| 2014/0111838 A1 | 4/2014 | Han et al. | |
| 2014/0125590 A1 | 5/2014 | Flagg et al. | |
| 2014/0153173 A1 | 6/2014 | Pombo et al. | |
| 2014/0168130 A1 | 6/2014 | Hirai | |
| 2014/0195247 A1 | 7/2014 | Parkinson et al. | |
| 2014/0218269 A1 | 8/2014 | Cazalet et al. | |
| 2014/0237366 A1 | 8/2014 | Poulos et al. | |
| 2014/0240245 A1 | 8/2014 | Kim | |
| 2014/0253605 A1 | 9/2014 | Border et al. | |
| 2014/0267419 A1 | 9/2014 | Ballard et al. | |
| 2014/0268054 A1 | 9/2014 | Olsson et al. | |
| 2014/0282118 A1 | 9/2014 | Kumamoto | |
| 2014/0282144 A1 | 9/2014 | Maciocci | |
| 2014/0282278 A1 | 9/2014 | Anderson et al. | |
| 2014/0289641 A1 | 9/2014 | Whitcroft | |
| 2014/0294302 A1 | 10/2014 | King et al. | |
| 2014/0361988 A1 | 12/2014 | Katz et al. | |
| 2014/0368412 A1 | 12/2014 | Jacobsen et al. | |
| 2014/0375544 A1 | 12/2014 | Venable et al. | |
| 2014/0380230 A1 | 12/2014 | Venable et al. | |
| 2015/0007114 A1 | 1/2015 | Poulos et al. | |
| 2015/0009132 A1 | 1/2015 | Kuriya et al. | |
| 2015/0067516 A1 | 3/2015 | Park et al. | |

(56) References Cited

U.S. PATENT DOCUMENTS

| | | | |
|---|---|---|---|
| 2015/0072672 A1* | 3/2015 | Jacobsen | G06F 3/011 |
| | | | 455/418 |
| 2015/0102984 A1 | 4/2015 | Wong et al. | |
| 2015/0128124 A1 | 5/2015 | Grey et al. | |
| 2015/0130740 A1 | 5/2015 | Cederlund et al. | |
| 2015/0138089 A1 | 5/2015 | Angerbauer et al. | |
| 2015/0142440 A1 | 5/2015 | Parkinson et al. | |
| 2015/0149168 A1 | 5/2015 | Stent et al. | |
| 2015/0153571 A1 | 6/2015 | Ballard et al. | |
| 2015/0186109 A1 | 7/2015 | Järvinen et al. | |
| 2015/0187352 A1* | 7/2015 | Parkinson | G10L 17/22 |
| | | | 704/251 |
| 2015/0199106 A1 | 7/2015 | Johnson et al. | |
| 2015/0206321 A1 | 7/2015 | Scavezze et al. | |
| 2015/0213778 A1 | 7/2015 | Moravetz et al. | |
| 2015/0220142 A1 | 8/2015 | Parkinson et al. | |
| 2015/0243288 A1 | 8/2015 | Katsuranis | |
| 2015/0288666 A1 | 10/2015 | Rao et al. | |
| 2015/0293597 A1 | 10/2015 | Mishra et al. | |
| 2015/0309316 A1 | 10/2015 | Osterhout et al. | |
| 2015/0324645 A1 | 11/2015 | Jang et al. | |
| 2015/0338914 A1 | 11/2015 | Andrysco | |
| 2015/0378160 A1 | 12/2015 | Lee et al. | |
| 2016/0004306 A1 | 1/2016 | Maltz | |
| 2016/0011755 A1* | 1/2016 | Douek | G06F 9/455 |
| | | | 715/704 |
| 2016/0026253 A1 | 1/2016 | Bradski et al. | |
| 2016/0034039 A1 | 2/2016 | Maeda et al. | |
| 2016/0041619 A1 | 2/2016 | Ishiwata et al. | |
| 2016/0054807 A1 | 2/2016 | Flagg et al. | |
| 2016/0062458 A1 | 3/2016 | Kristensson et al. | |
| 2016/0077337 A1 | 3/2016 | Raffle et al. | |
| 2016/0085077 A1 | 3/2016 | Milea et al. | |
| 2016/0092048 A1 | 3/2016 | Van Den Broek et al. | |
| 2016/0093105 A1 | 3/2016 | Rimon et al. | |
| 2016/0110054 A1 | 4/2016 | Kondik et al. | |
| 2016/0124501 A1 | 5/2016 | Lam et al. | |
| 2016/0147302 A1 | 5/2016 | Choi | |
| 2016/0162020 A1 | 6/2016 | Lehman et al. | |
| 2016/0178912 A1 | 6/2016 | Kusuda et al. | |
| 2016/0179855 A1 | 6/2016 | Roman et al. | |
| 2016/0188283 A1 | 6/2016 | Sendai et al. | |
| 2016/0191172 A1 | 6/2016 | Masarik | |
| 2016/0234190 A1 | 8/2016 | Hird | |
| 2016/0249124 A1 | 8/2016 | Drinkwater et al. | |
| 2016/0259862 A1 | 9/2016 | Navanageri et al. | |
| 2016/0261590 A1 | 9/2016 | Pierce et al. | |
| 2016/0274776 A1 | 9/2016 | Scheff | |
| 2016/0283724 A1 | 9/2016 | Hird | |
| 2016/0292922 A1 | 10/2016 | Kasahara | |
| 2016/0324248 A1 | 11/2016 | Winters et al. | |
| 2016/0329634 A1 | 11/2016 | Osterhout et al. | |
| 2016/0342782 A1 | 11/2016 | Mullins et al. | |
| 2016/0370855 A1 | 12/2016 | Lanier et al. | |
| 2016/0370970 A1 | 12/2016 | Chu et al. | |
| 2017/0017464 A1 | 1/2017 | Roy | |
| 2017/0060230 A1 | 3/2017 | Faaborg et al. | |
| 2017/0076504 A1 | 3/2017 | Oar et al. | |
| 2017/0092002 A1 | 3/2017 | Mullins et al. | |
| 2017/0103680 A1 | 4/2017 | Campbell et al. | |
| 2017/0115728 A1 | 4/2017 | Park et al. | |
| 2017/0160812 A1 | 6/2017 | Park et al. | |
| 2017/0161240 A1 | 6/2017 | Lee et al. | |
| 2017/0168305 A1 | 6/2017 | Kusuda et al. | |
| 2017/0337177 A1 | 11/2017 | Maxwell, III et al. | |
| 2017/0337897 A1 | 11/2017 | Jung et al. | |
| 2017/0344609 A1 | 11/2017 | Wadley et al. | |
| 2017/0351778 A1 | 12/2017 | Sperling | |
| 2018/0011326 A1 | 1/2018 | Ishizaki | |
| 2018/0018073 A1 | 1/2018 | Lemay et al. | |
| 2018/0033204 A1 | 2/2018 | Dimitrov et al. | |
| 2018/0088746 A1 | 3/2018 | Cheung et al. | |
| 2018/0121265 A1 | 5/2018 | Rosnow et al. | |
| 2018/0129276 A1 | 5/2018 | Nguyen et al. | |
| 2018/0131907 A1 | 5/2018 | Schmirler et al. | |
| 2018/0143756 A1 | 5/2018 | Mildrew et al. | |
| 2018/0150204 A1 | 5/2018 | Macgillivray et al. | |
| 2018/0247402 A1 | 8/2018 | Xie et al. | |
| 2018/0276896 A1 | 9/2018 | Launonen | |
| 2018/0321493 A1 | 11/2018 | Kim et al. | |
| 2018/0341627 A1 | 11/2018 | Moldovean et al. | |
| 2018/0356884 A1 | 12/2018 | Lee | |
| 2018/0373325 A1 | 12/2018 | Rosso et al. | |
| 2019/0050112 A1 | 2/2019 | Kandadai et al. | |
| 2019/0362557 A1 | 11/2019 | Lacey et al. | |

FOREIGN PATENT DOCUMENTS

| | | |
|---|---|---|
| CN | 101518097 A | 8/2009 |
| CN | 101673161 A | 3/2010 |
| CN | 201674632 U | 12/2010 |
| CN | 103091844 A | 5/2013 |
| CN | 103198093 A | 7/2013 |
| CN | 203233453 U | 10/2013 |
| CN | 103870512 A | 6/2014 |
| CN | 104123294 A | 10/2014 |
| CN | 104407478 A | 3/2015 |
| CN | 104969115 A | 10/2015 |
| CN | 105228089 A | 1/2016 |
| CN | 105229720 A | 1/2016 |
| CN | 105848040 A | 8/2016 |
| CN | 106066537 A | 11/2016 |
| CN | 205691868 U | 11/2016 |
| CN | 205691887 U | 11/2016 |
| DE | 202017105691 U1 | 1/2018 |
| JP | H05-183838 A | 7/1993 |
| JP | H09-130705 A | 5/1997 |
| JP | 2001-520831 A | 10/2001 |
| JP | 2002-182914 A | 6/2002 |
| JP | 2004-247897 A | 9/2004 |
| JP | 2006-319440 A | 11/2006 |
| JP | 2007-064997 A | 3/2007 |
| JP | 2009-33308 A | 2/2009 |
| JP | 2009-070295 A | 4/2009 |
| JP | 2009-122476 A | 6/2009 |
| JP | 2010-003159 A | 1/2010 |
| JP | 2010-160538 A | 7/2010 |
| JP | 2011-169449 A | 9/2011 |
| JP | 2011-170418 A | 9/2011 |
| JP | 2013-093705 A | 5/2013 |
| JP | 2013-143151 A | 7/2013 |
| JP | 2013-541092 A | 11/2013 |
| JP | 2015-041868 A | 3/2015 |
| JP | 2016-012838 A | 1/2016 |
| JP | 2016-054351 A | 4/2016 |
| JP | 2016-063270 A | 4/2016 |
| JP | 2018-077762 A | 5/2018 |
| WO | 00/55673 A1 | 9/2000 |
| WO | 2012/040107 A1 | 3/2012 |
| WO | 2016/039254 A1 | 3/2016 |
| WO | 2016/039366 A1 | 3/2016 |

OTHER PUBLICATIONS

"RealWear", Retrieved from the Internet URL: <www.facebook.com/RealWearInc/>, p. 1 (Sep. 15, 2016).

Office Action received in European Patent Application No. 17884064.1, dated Aug. 17, 2022, 6 pages.

Malaysian Office Action and Search Report received for Malaysian Patent Application No. PI2019003452, dated Aug. 30, 2022, 2 pages.

Notice of Allowance received in Chinese Patent Application No. 201780086276.8, dated Sep. 23, 2022, 7 pages. [English Translation submitted].

Malaysian Office Action and Search Report received for Malaysian Patent Application No. PI2019003461, dated Oct. 13, 2022, 2 pages.

Office Action received for European Patent Application No. 17882453.8, dated Oct. 17, 2022, 7 pages.

Office Action received for European Patent Application No. 19820426.5, dated Nov. 23, 2022, 6 pages.

(56) References Cited

OTHER PUBLICATIONS

Office Action received for Vietnamese Patent Application No. 1-2019-04006, dated Dec. 1, 2022, 3 pages. (English translation submitted).
Office Action received for Vietnamese Patent Application No. 1-2019-04007, dated Dec. 1, 2022, 3 pages. (English translation submitted).
Intention to grant received for European Patent Application No. 17882728.3, dated Dec. 16, 2022, 63 pages.
Intention to grant received for Vietnam Patent Application No. 1-2019-04006, dated Jun. 30, 2023, 2 pages. (English translation submitted).
Intention to grant received for Vietnamese Patent Application No. 1-2019-04007, dated Apr. 18, 2023, 2 pages. (English translation submitted).
Intention to grant received for European Patent Application No. 17885286.9, dated Apr. 14, 2023, 55 pages.
Notice of Reasons for Refusal and Search received for Japanese Patent Application No. 2020-569036, dated May 26, 2023, 78 pages. (English translation submitted).
Intention to grant received for European Patent Application No. 17884876.8, dated May 4, 2023, 35 pages.
Notice of Reasons for Refusal received for Japanese Patent Application No. 2019-555417, dated Apr. 11, 2023, 4 pages. (English translation submitted).
Decision to Grant a Patent received for Japanese Patent Application No. 2020-569036, dated Nov. 8, 2023, 6 pages. (English Translation Submitted).
Notice of Allowance received in Chinese Patent Application No. 201780084354.0, dated Nov. 15, 2023, 7 pages. [English Translation submitted].

\* cited by examiner

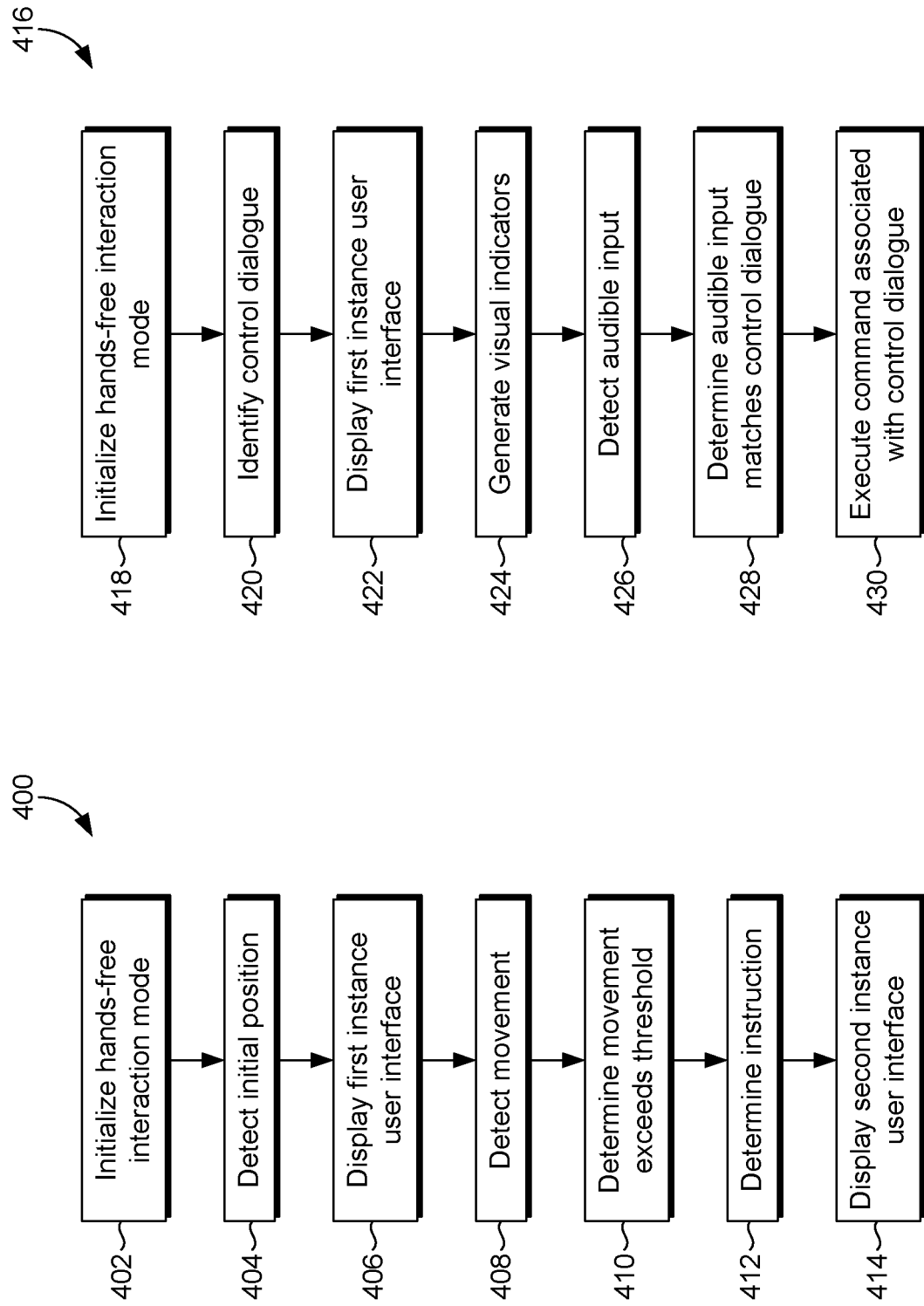

CUSTOMIZING USER INTERFACES OF BINARY APPLICATIONS

CROSS-REFERENCE TO RELATED APPLICATIONS

This application is a continuation of prior application Ser. No. 16/007,773, filed Jun. 13, 2018, entitled CUSTOMIZING USER INTERFACES OF BINARY APPLICATIONS, which is a continuation-in-part of prior application Ser. No. 15/390,191, filed Dec. 23, 2016, entitled HANDS FREE NAVIGATION OF TOUCH BASED OPERATING SYSTEMS, each of which is assigned or under obligation of assignment to the same entity as this application, the entire contents of the application being herein incorporated by reference.

BACKGROUND

Touch-based devices, such as smartphones, tablets, and laptops, have become a ubiquitous aspect of daily life. For example, it is now common that a person will organize and conduct social interactions through applications on a smartphone or tablet. Further, businesses often rely on touch-based devices to communicate with employees, monitor jobs, and review project data, among any number of other uses. Touch-based devices typically run touch-based operating systems (such as Android or iOS), which inherently rely on touch-based inputs to control interaction with the operating systems. As useful and valuable as these devices are, they all have the same limitation; at a primary level, they require a user to interact manually directly with the device.

For example, touch-based operating systems now primarily rely on virtual keyboards for receiving textual input. Virtual keyboards often have relatively small buttons where words must be spelled out one letter at a time, which can be time-consuming and impractical for inputting messages of even moderate length. Some touch-based operating systems provide speech recognition to translate text into words, however, such speech recognition often requires an Internet connection, which may not always be available. Further, even if speech recognition is available, it is typically limited to textual input, and touch-based operating systems provide limited mechanisms for navigating user interfaces within applications and navigating between multiple applications. For example, navigating a multipage document in touch-based operating systems generally requires the user to touch the screen at the scroll bar to navigate horizontally, or "swipe" the screen to scroll.

However, users may desire (or need) to use these devices during periods where manual touch-based interaction is infeasible, difficult, or impossible. For example, many individuals may not have the ability to interact physically with touch-based devices, yet need or desire to do so. Additionally, even when a user can physically interact with a touch-based device, environmental restrictions may restrict manual interactions with devices in a safe or comfortable manner. Further, it may be desirable to access functionalities of a touch-based device while a user is engaged in a task that requires the user's hands.

Previous attempts to solve these problems often relied on highly specialized, purpose-built devices or processes that provided cumbersome and inflexible user experiences. Further, previous solutions required modification of source code from existing applications designed for touch-based operating systems, such that the applications were compatible with hands-free input sources. It would also be impractical to modify every touch-based application to facilitate a touch-free solution. Accordingly, existing solutions were only compatible with a few select touch-based applications. Additionally, prior solutions have failed to enable interaction with the touch-based operating systems themselves, and instead rely on their own operating system. As a result, prior solutions generally required a user to have to learn a brand new operating environment, rather than enable interaction with existing and heavily-adopted touch-based operating systems.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

To address these problems, the present invention is generally directed to systems and methods for facilitating hands-free navigation of touch-based operating systems by customizing the user interfaces of binary applications. Further, the aspects described herein facilitate hands-free interaction with touch-based operating systems and applications without requiring modification of source code. That is to say, aside from implementing the system and/or method described herein, a user is not required to change to a different application or abandon a familiar touch-based operating system to enjoy the advantages of hands-free interaction. Additionally, though not required, in embodiments, a user may customize the hands-free navigation to provide tailored functionality based on their needs and desires.

Accordingly, aspects of the technology described herein provide for a system and method that facilitate hands-free navigation of touch-based operating systems. In one aspect, the hands-free navigation system analyzes a touch-based user interface of a touch-based operating system to identify touch-based scrolling features, associates the scrolling features with hands-free commands, and presents the touch-based user interface on a display to the user. Then, as the system is rotated, translated, or otherwise moved in 3D space, the system may detect those movements and convert them into touch-based commands in the touch-based user interface of the touch-based operating system. In other words, the system may convert touch-based scrolling features into motion-based commands, detect motion, and convert the motion into scrolling commands. As such, the touch-based operating system may be converted into a hands-free operating system that may utilize motion-based user commands.

In another aspect, the hands-free system analyzes a touch-based user interface of a touch-based operating system to identify control dialogues (such as icons associated with commands), associates the control dialogues with keyword cues, and presents the touch-based user interface on a display to the user. Then, the system may process audio input, identify keyword cues within the audio input, and convert the keyword cues into the associated touch-based commands in the touch-based user interface of the touch-based operating system. In other words, the system converts touch-based commands into keyword cues, which when spoken by the user, may cause the desired command to be executed in the touch-based environment. As such, the touch-based operating system may be converted into a hands-free operating system that may utilize voice-based user commands. To ease user interaction, in another aspect, the system may present keyword cue overlays that are superimposed on the touch-based user interface. These overlays may provide helpful visual prompts to aid the user in issuing keyword cues to facilitate a selection of the desired control dialogue.

Another aspect of the technology described herein provides for a system and method that facilitates the use of hands-free navigation of touch-based application running on a touch-based operating systems by customizing the user interfaces of binary applications to display a user interface label (such as numbers or keywords) overlaid on touch-interactive objects. The system may receive audio input (e.g., audio data via a microphone), process the audio input, identify keyword cues within the audio input, and convert the keyword cues into those associated with the user interface labels to manipulate the touch-based application running on the touch-based operating system. This customization does not require resource-intense modifications to the source code of the touch-based application in order to permit touch-free operation.

In one aspect, the various hands-free input types disclosed herein may be used simultaneously or in conjunction with one another. For example, the system may be responsive to both motion-based user commands and voice-based user commands at the same time. Further, methods are provided which may facilitate hands-free navigation using motion-based user commands, voice-based user commands, and motion plus voice-based user commands.

BRIEF DESCRIPTION OF THE DRAWINGS

The present disclosure is described in detail below with reference to the attached drawing figures, wherein:

FIG. 4A depicts an exemplary motion-based hands-free interaction method, in accordance with aspects hereof;

FIG. 4B depicts an exemplary audio-based hands-free interaction method, in accordance with aspects hereof;

DETAILED DESCRIPTION

Figure 1:
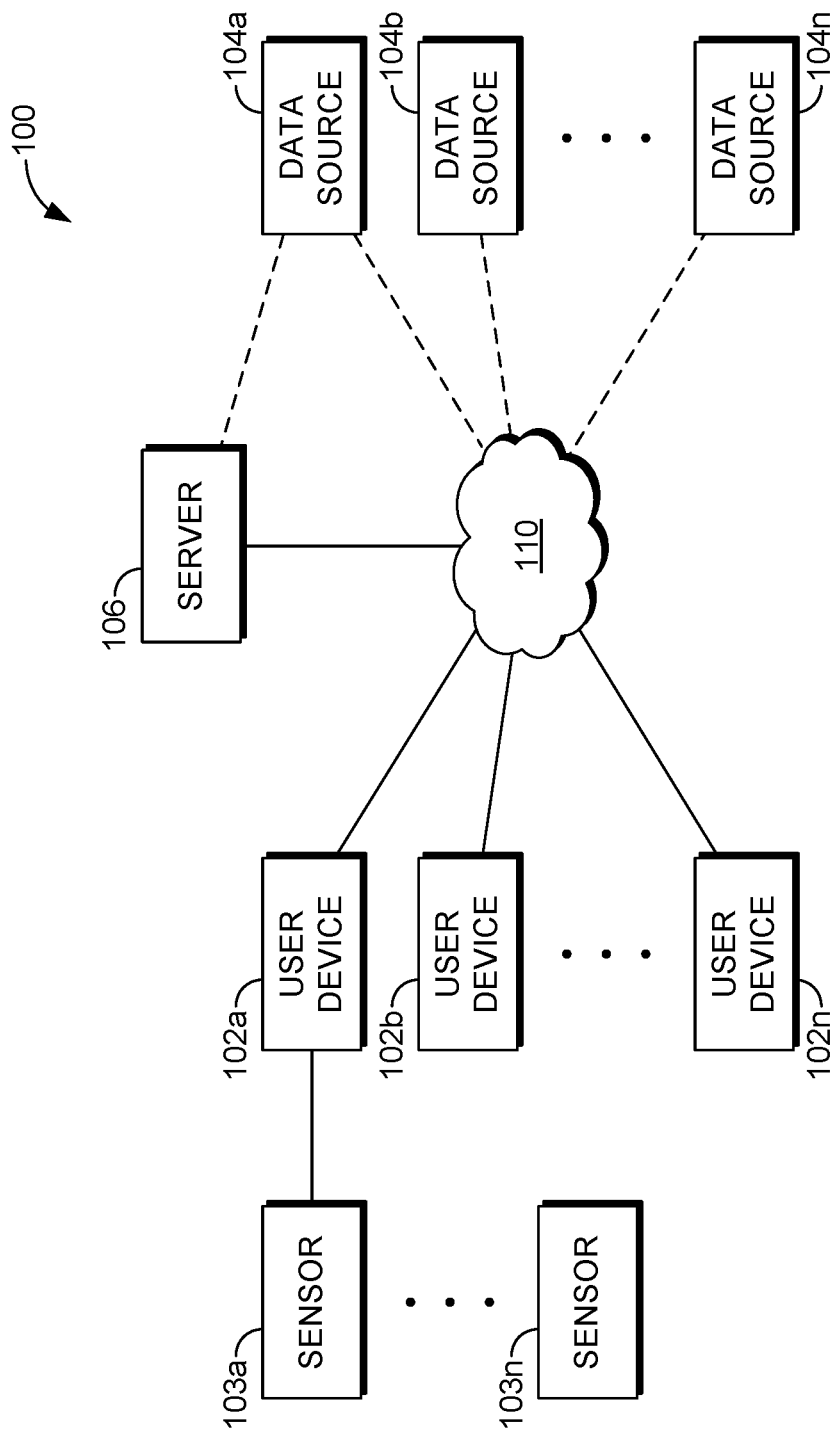
FIG. 1 depicts an exemplary computing environment suitable for use in implementing embodiments of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At a high level, aspects herein relate to mechanisms that enable hands-free interaction with touch-based operating systems. As can be appreciated, touch-based operating systems (such as Android, iOS, and the like) often rely on input received via a touchscreen of a mobile device running the touch-based operating system. However, interaction with a touchscreen may not be possible or desirable, depending on the abilities of the user and the situation in which the mobile device is used. For example, when a user is using their hands to perform another task, it is often inconvenient and time-consuming to discontinue the task and interact with the touch-based operating system. Accordingly, aspects of this relate to devices, methods, and systems that facilitate hands-free interaction with touch-based operating systems.

One aspect herein relates to a head-mounted computing device (such as a headset) that implements a method for hands-free interaction with a touch-based operating system. In a non-limiting example, the headset may include a display (such as a heads up display, an ocular display, and the like), sensors (such as cameras, microphones, accelerometers, gyroscopes, magnetometers, among others), one or more processors, and a memory. The headset may be communicatively coupled with a mobile device running the touch-based operating system. The headset may also be configured to display an instance of a user interface of the touch-based operating system, for example, on the ocular display of the headset. Further, the headset may provide the hands-free interaction mode that facilitates interaction with the user interface of the touch-based operating system using hands-free inputs received via the sensors. For example, one exemplary aspect uses movements detected by the headset to determine instructions or commands for navigating for executing operations of the touch-based operating system.

Another exemplary aspect uses voice commands detected by the headset to determine instructions or commands for executing operations of the touch-based operating system. Accordingly the headset may also be configured to monitor the included sensors (such as microphones, among others), analyze the input received by the sensors, determine instructions or commands of the touch-based operating system associated with the input, and execute the instructions or commands for navigating within the user interface of the touch-based operating system. Further, the headset may be configured to analyze the user interface of the touch-based operating system and the code associated with the touch-based operating system in real time using headset components or software modules to facilitate the hands-free interaction mode.

Another exemplary aspect uses both voice commands and movements detected by the headset to determine instruction or commands for navigating the user interface of the touch-based operating system and executing operations of the touch-based operating system. Further, the headset may include or be in communication with customized databases that comprise context specific data (such as user specific settings, hands-free interface specific settings, keyword cue libraries, touch-based interface specific settings, location specific settings, and the like) to enhance the usability of the hands-free interaction mode. The headset may include a wireless communication system (such as Bluetooth, NFC, RFID, WIFI, and the like) to enhance the usability of the hands-free interaction mode. By way of example, the wireless communication system may enhance the usability of the hands-free interaction mode by providing location information to the headset which may correlate to context specific data stored in the customized databases. The headset may be communicatively coupled with a mobile device equipped with a wireless communication system to enhance the usability of the hands-free interaction mode. Additionally, the headset may be configured to utilize network-based customized databases that comprise the context specific data.

Yet another exemplary aspect uses user interface trees to generate user interface labels that are overlaid on a user interface display for hands-free manipulation. An initialized application on a touch-based device may be interrogated and a user interface tree generated by the initialized application may be detected. At least one GUI element reference may be extracted from the user interface tree. A user interface label may be generated for each GUI element reference and may be displayed on a the display of a hands-free operating system, for example. A user of the hands-free operating system may use voice or movement commands, correlating with the user interface label, to manipulate the touch-based application. Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a-102n; a number of data sources, such as data sources 104a and 104b through 104n; server 106; sensors 103a-103n, and network 110. It should be understood that environment 100 shown in FIG. 1 is an example of one suitable operating environment. Each of the components shown in FIG. 1 may be implemented via any type of computing device, such as computing device 1000, described in connection to FIG. 10, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 maybe provided via multiple devices arranged in a distributed environment that collectively provide the functionality described herein. Additionally, other components not shown may also be included within the distributed environment.

User devices 102a-102n may comprise any type of computing device capable of use by a user. For example, in one embodiment, user devices 102a-102n may be the type of computing device described in relation to FIG. 10 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, a camera, remote control, a bar code scanner, a computerized measuring device, appliance, consumer electronic device, a workstation, a head-mounted computing device, or any combination of these delineated devices, or any other suitable device.

User devices 102a-102n can be client devices on the client-side of operating environment 100, while server 106 can be on the server-side of operating environment 100. Server 106 can comprise server-side software designed to work in conjunction with client-side software on user devices 102a-102n so as to implement any combination of the features and functionalities discussed in the present disclosure. This division of operating environment 100 is provided to illustrate one example of a suitable environment, and there is no requirement for each implementation that any combination of server 106 and user devices 102a-102n remain as separate entities.

Data sources 104a and 104b through 104n may comprise data sources and/or data systems, which are configured to make data available to any of the various constituents of operating environment 100, or hands-free interaction system 200 described in connection to FIG. 2. For instance, in one embodiment, one or more data sources 104a through 104n provide (or make available for accessing) storage 270 of FIG. 2. Data sources 104a and 104b through 104n may be discrete from user devices 102a-102n and server 106 or may be incorporated and/or integrated therewith. In one embodiment, one or more of data sources 104a though 104n comprises one or more sensors, which may be integrated into or associated with one or more of the user devices 102a-102n or server 106. Operating environment 100 can be utilized to implement one or more of the components of hands-free interaction system 200, described in FIGS. 2 and 3, including components for motion processing, sound processing, and data storage such as keyword custom libraries, user data, and context specific data.

Figure 2:
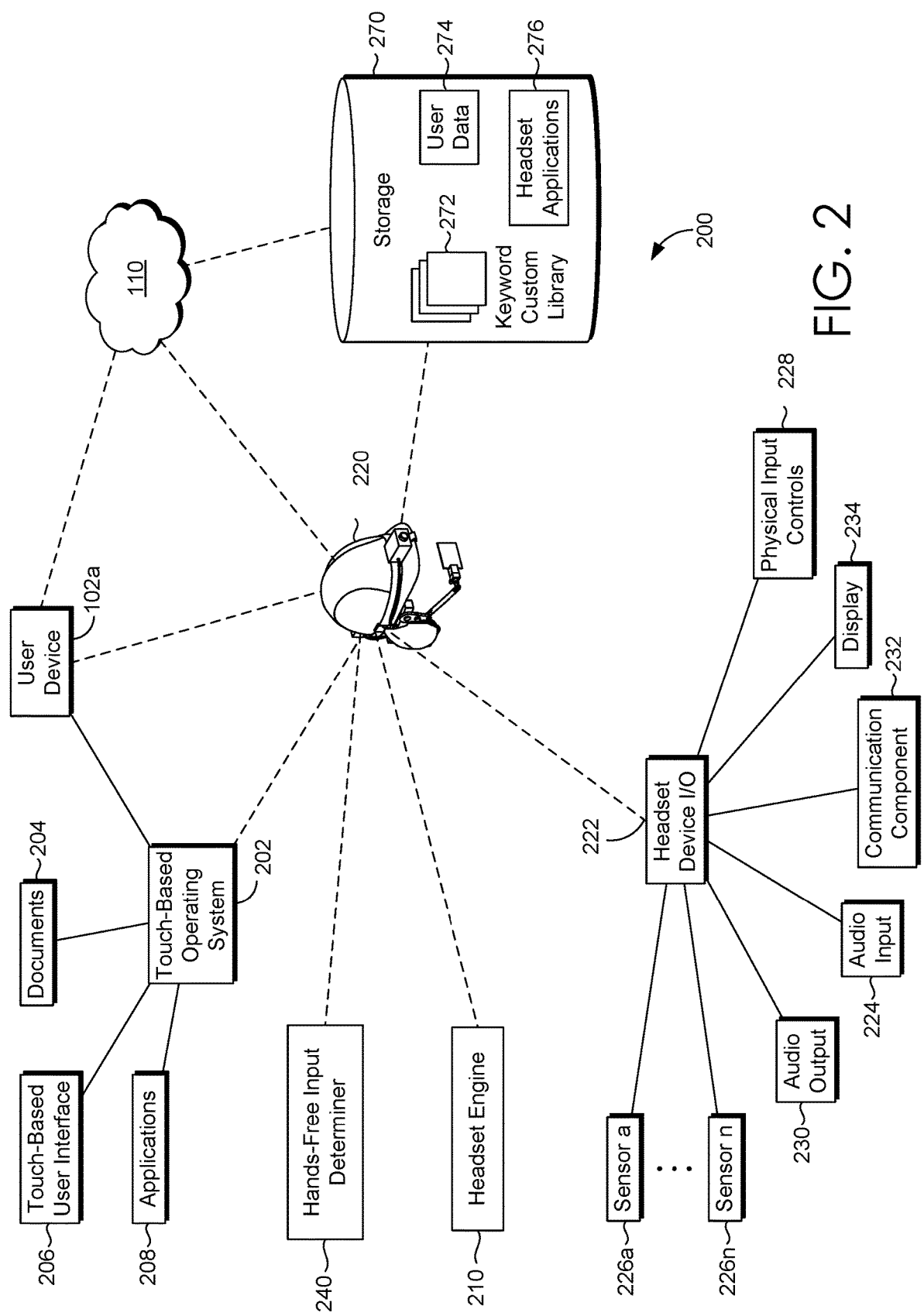
FIG. 2 depicts an exemplary hands-free navigation system, in accordance with aspects hereof.

Turning now to FIG. 2, a block diagram is provided illustrating an exemplary embodiment of hands-free interaction system 200 in which some embodiments of the present disclosure may be employed. Hands-free interaction system 200 generally operates to facilitate hands-free interaction with applications and features of a touch-based operating system 202. It should be understood that the hands-free interaction system 200 shown in FIG. 2 is an example of one system in which embodiments of the present disclosure may be employed. Each component shown may include one or more computing devices similar to the operating environment 100 described with reference to FIG. 1. The hands-free interaction system 200 should not be interpreted as having any dependency or requirement related to any single module/component or combination of modules/components illustrated therein. For instance, hands-free interaction system 200 may comprise multiple devices arranged in a distributed environment that collectively provide the functionality described herein. It should be understood that the hands-free interaction system 200 and/or its various components may be located anywhere in accordance with various embodiments of the present disclosure.

Head-mounted computing device 220 (described in more detail with reference to FIG. 9) generally facilitates hands-free interaction with a touch-based user interface 206 of a touch-based operating system 202. The head-mounted computing device 220 may comprise a variety of headset device input and output components, such as motion and audio sensors, displays, and input controls, among others. Additionally, the head-mounted computing device 220 may include computer-usable instructions stored on computer storage media, such as storage 270. Accordingly, the head-mounted computing device 220 may be configured to execute computing processes that may be performed using any combination of hardware, firmware, and/or software. For instance, various functions may be carried out by a processor (e.g., headset processor 280) executing instructions stored in memory. The methods may be provided by a standalone application, a service or hosted service (standalone or in combination with another hosted service), or a plug-in to another product, to name a few.

The functions and processes performed by the hands-free interaction system 200 may be associated with applications, services, or routines (such as headset applications 276). In particular, such applications, services, or routines may operate on the head-mounted computing device 220, or may be distributed across multiple devices. For example, the functions and processes described herein may execute on a touch-based user device (such as user device 102a), servers (such as server 106), or be implemented in the cloud. Moreover, in some embodiments the components of hands-free interaction system 200 may be distributed across the network 110. Additionally, these components, functions performed by these components, or services carried out by these components, may be implemented at appropriate abstraction layer(s), such as the operating system layer, application layer, hardware layer, etc., of the computing system(s). Alternatively, or in addition, the functionality of these components and/or the embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regard to specific components shown in example hands-free interaction system 200, it is contemplated that in some embodiments functionality of these components can be shared or distributed across other components.

Accordingly, head-mounted computing device 220, may include one or more headset processors 280 that execute instructions (which may be stored by headset applications 276) for providing a hand-free interaction mode. The hands-free interaction mode may facilitate interaction with programs, applications, and features of the touch-based operating system 202 via the head-mounted computing device 220. In one aspect, the headset applications 276 include instructions for facilitating hands-free interaction with existing binary applications (such as applications 208), that operate in touch-based operating system 202. For example, the hands-free interaction system 200 may be configured for use with any number of applications, via native or existing binaries, such as applications available from the Playstore, Appstore, and any other source of touch-based applications. Further, a headset engine 210 may interrogate applications 208 running on the touch-based operating system 202 to determine screen components/features, such as such input controls, form elements, and navigation commands, among others, included in a touch-based user interface 206. For instance, the headset engine 210 may analyze the user interface layer of the touch-based operating system 202 to determine when various screen components/features are being provided for display. In this way, as a touch-based application is being executed, various displayed UI components of the application can be determined. The screen components/features may then be extracted or identified, and provided to the other components of hands-free interaction system 200 for processing, as will be described. As a result, virtually any application that is operable with touch-based operating system 202 may be enabled for hands-free interaction, at runtime. Additionally, the hands-free interaction system 200 may include XML files for applications that are not compatible with standard hands-free interaction mode instructions. The XML, files may override the standard hands-free interaction mode instructions, and provide customized instructions. Additionally, the XML files may be merged with existing binaries of the applications 208 at runtime so that the existing binaries do not need to be modified.

Further, the head-mounted computing device 220 may include various headset device I/O 222, components, which may, for example, sense or detect hands-free inputs received via head-mounted computing device 220. The received inputs may be processed, for example, by hands-free input determiner 240, to generate one or more hands-free commands. Further, the hands-free interaction system 200 may be configured to determine and/or generate commands associated with received hands-free inputs. The generated hands-free commands may be communicated (for example, by a communication component 232) to the touch-based operating system 202 for execution. The determined commands may programmatically instruct the touch-based operating system 202 to execute the commands, as if it were executing corresponding touch-based inputs.

Headset engine 210 is generally responsible for facilitating communication between touch-based operating system 202, touch-based user interface 206, motion processing system 242, sound processing system 250, interface analyzer 212, storage 270, headset device input/output (I/O) 222, and their respective subcomponents. In some aspects, headset engine 210 initializes the hands-free interaction mode in response to receiving a signal from headset device I/O 222. For example, physical input control(s) 238 (such as a button, switch, or the like) may receive input that initializes the hands-free interaction mode. In some aspects, headset engine 210 also initializes the analysis of the touch-based user interface 206 and/or touch-based operating system 202, such that touch-based scrolling features and touch-based control dialogues determined. In some aspects, headset engine 210 receives motion data (e.g., from sensors 226a-226n) and transmits the information hands-free input determiner 240. In some aspects, headset engine 210 receives audio input 224 from headset device I/O 222 and transmits the information to hands-free input determiner 240.

Touch-based user interface 206 generally facilitates user interaction with the touch-based operating system 202 in the hands-free interaction system 200. In some aspects, the touch-based user interface 206 may comprise touch-based scrolling features (such as "swipe" features, horizontal scroll bars, vertical scroll bars, and the like). In some aspects, the touch-based user interface 206 comprise touch-based control dialogues (such as text boxes or fields, check boxes, application icons, document tools, radio buttons, and the like, for example).

In aspects, storage 270 may include a keyword custom library 272. The keyword custom library 272 may comprise a database containing keyword cue to touch-based control dialogue associations. In aspects, storage 270 may also comprise user specific settings, preferences, thresholds, permissions, or any data associated with an individual or group of individuals. In aspects, storage 270 may headset applications 276. Storage 270 may be communicatively coupled with the any of the components and subcomponents of hands-free interaction system 200.

Audio input 224 generally refers to components for capturing audio, such as microphones and the like (e.g. directional and omnidirectional microphones). In embodiments, audio input 224 may comprise multiple microphones located at various points of head-mounted computing device 220 configured such that ambient noise may be captured and ultimately used to aid in processing and analysis of user audio inputs. It will be understood that audio input 224 may be any sensor or system of sensors capable of perceiving audio input and converting audio input into an audio feed without departing from the scope of this disclosure. Audio output 230 generally facilitates sound output to the user. It will be understood that any audio output component or components capable of producing sound in response to electrical input (such as a speaker) may be used in embodiments without departing from the scope of this disclosure. In embodiments, audio output 230 may be configured to communicate with at least headset device I/O 222. Communication component 232 generally facilitates communication between the head-mounted computing device 220 and other devices through any suitable communication protocol. In embodiments, communication component may comprise a wireless communication system discussed above or below with reference to FIG. 10.

Display 234 generally facilitates a visual presentation of data to the user. It will be understood that any display may be used in various embodiments without departing from the scope of this disclosure. Sensors 226a-226n may include cameras, microphones, GPS, RFID sensors, infrared sensors, light sensors, magnetometers, gyroscopes, capacitive transducers, potentiometers, resistive transducers, synchros, accelerometers, and micro-gyroscopes, among others.

Figure 3:
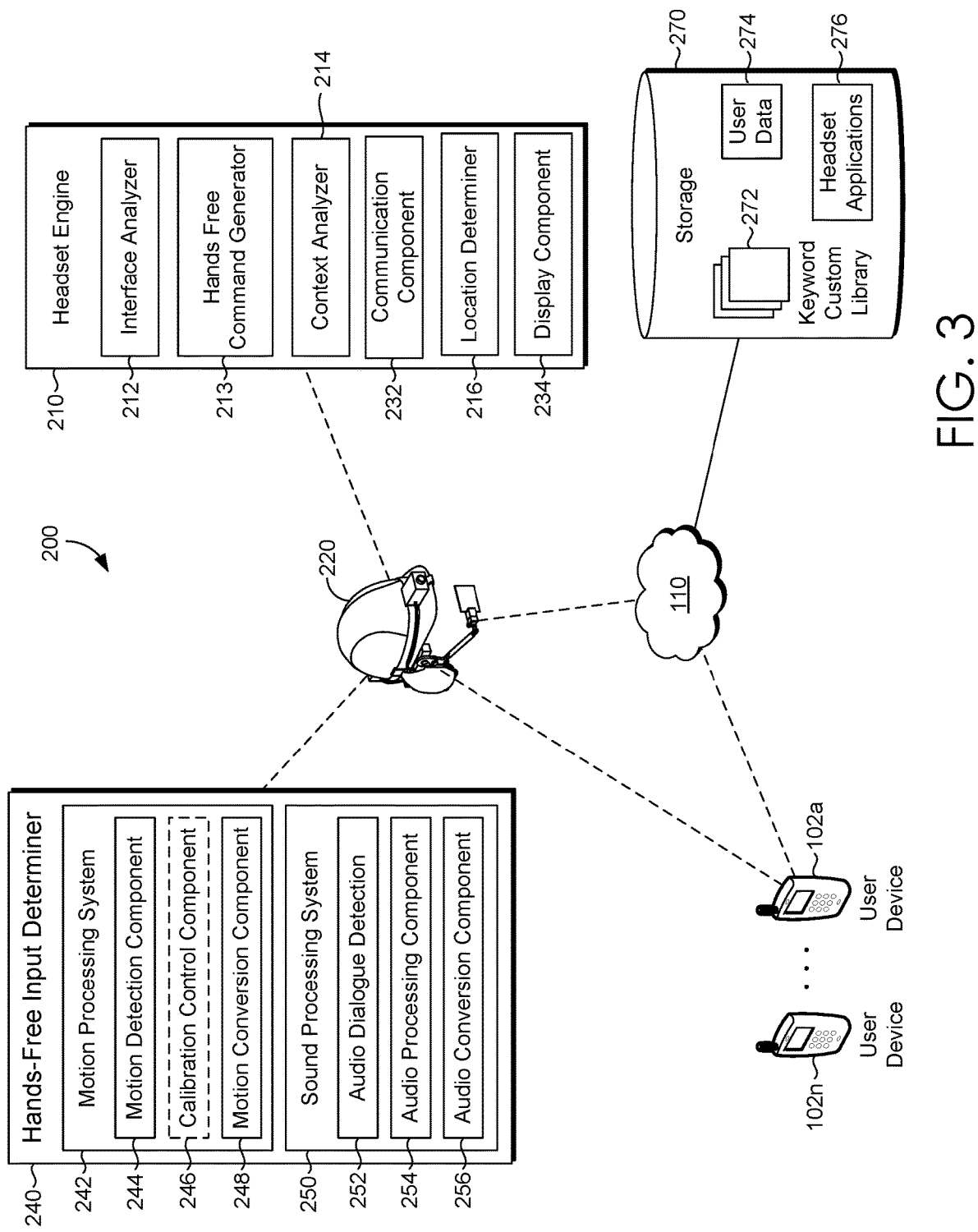
FIG. 3 depicts the exemplary hands-free navigation system depicted in FIG. 2, in accordance with additional aspects hereof.

Turning now to FIG. 3, a block diagram is provided illustrating additional aspects of the hands-free interaction system 200 in which an exemplary head-mounted computing device 220 may employ some embodiments of the present disclosure. The head-mounted computing device 220 may comprise systems for motion capturing, motion analysis, audio input, audio analysis, audio output, image capture, location detection, orientation determination, contextual determination, interface display, location detection, and network connectivity in which some embodiments of the present disclosure may be employed; a user devices 102a-102n, which may communicatively couple with the head-mounted computing device 220 and which may communicatively couple with the network 110; the network 110, which is described in connection to FIG. 1; a server, 106; and, a data source, 104a. The components of the hands-free interaction system 200 may be embodied as a set of compiled computer instructions or functions, program modules, computer software services, or an arrangement of processes carried out on one or more computer systems, as computing device 1000 described in connection to FIG. 10, for example.

In one embodiment, the functions performed by the components of the hands-free interaction system 200 are associated with converting displacement into touch-based instructions, commands, or input within a touch-based operating system. In embodiments, the hands-free interaction system 200 includes a head-mounted computing device headset input/output (I/O) 222, a headset engine 210, and hands-free input determiner 240 which may be responsible for detecting, processing, distributing, monitoring, and/or activating other systems or subsystems within the hands-free interaction system 200. For example, in response to receiving an activation command the headset engine 210 may initialize a hands-free interaction mode on the head-mounted computing device, wherein the hands-free interaction mode enables interaction with the user interface of a touch-based operating system (OS). As part of the initialization of the hands-free interaction mode the headset engine 210 may activate interface analyzer 212, motion processing system 242, sound processing system 250, and context analyzer 214.

Motion processing system 242 generally facilitates the processing of motion based input data detected by the headset device I/O 222. The motion processing system 242 may reside in the head-mounted computing device 220, user devices 102a-102n, server 106, or any location capable of being communicatively connected with hands-free interaction system 200, for example via network 110. In embodiments, the motion processing system 242 may be a subsystem of the headset engine. In embodiments, the motion processing system 242 may be a subsystem of one or more user devices 102a-102n communicatively coupled with the head-mounted computing device 220 through communication component 232. In other embodiments, the motion processing system 242 may be a subsystem of one or more networked devices communicatively coupled with the head-mounted computing device 220 through communication component 232.

As such, data from sensors 226a-226n may be transmitted to the motion processing system 242 for analysis. In some embodiments the motion processing system 242 may contain sub-components, including motion detection component 244, calibration control component 246, and motion conversion component 248 (described in more detail below). In aspects, motion processing system 242 may be communicatively connected with hands-free interaction system 200 through communication component 232. Lateral, translational, and rotational movements of the headset may be detected by the sensors 226a-226n and processed by the motion processing system 242 to determine a neutral position and orientation. For example, the sensor data may be processed by the motion processing system 242 to detect position and orientation of the headset relative to three axes and in nine degrees of freedom. In embodiments, motion processing system 242 may calibrate the neutral position during initiation of the hands-free interaction mode by detecting the orientation of the headset at initiation of the hands-free interaction mode.

In aspects, a threshold displacement may be a predetermined displacement value from the neutral position, such as a rotation of the headset by +/−10 degrees from neutral, in any axis. Additionally, the threshold displacement may be an angular displacement, a translational movement, a rotation, or any other movement of the head-mounted computing device 220. As can be appreciated, although generally referred to as singular in this description, any number of threshold displacements may be determined. The threshold displacements may correspond to any number of touch-based inputs for interacting with the touch-based operating system 202. For example, a scroll-up touch-based input may have a corresponding hands-free input of rotation of the head-mounted computing device 220 upward. Accordingly, the hands-free rotational input may have a corresponding threshold of a predetermined number of degrees upward from the neutral position. As a result, inadvertent hands-free inputs may be reduced or eliminated.

In other aspects, the threshold displacement may be automatically and iteratively adjusted, for example, by the motion processing system 242 and/or headset engine 210. By way of example and not limitation, the hands-free interaction system 200 may include computer learning or machine learning instructions that monitor hands-free input (which may be stored in user data 274) to adjust threshold displacement is based on prior headset motion data. In other aspects, the threshold displacements may be automatically adjusted based on usage data for the associated with any number of locations (which may be determine, e.g., by location determiner 216) associated with the head-mounted computing device 220. In other aspects, the displacement threshold may be a customized value, which may be determined by a user. For example, a user may adjust threshold displacement settings via a user interface of a hands-free interaction application, which may be stored within the hands-free interaction system 200 and executed by any of the devices described herein. Accordingly, the motion processing system 242 may compare detected displacement, or translation of the headset with the threshold displacement, as will be described in more detail hereinafter.

The motion detection component 244 may monitor the motion processing system 242 to detect displacement of the head-mounted computing device 220. For example, the motion detection component 244 may compare the initial reference image stored by the calibration control component 246 with subsequent images captured by the motion processing system 242 to detect displacement of the head-mounted computing device 220 relative to the initial position of the head-mounted computing device 220. It will be understood that any number of image analysis algorithms may be used to detect displacement of the head-mounted computing device 220 relative to the initial position of the head-mounted computing device 220 by comparing an initial reference image with a subsequent image. Further, threshold and/or detected displacements may include determining a duration of a displacement. For example, a threshold displacement may require that the displacement be maintained for a duration of five seconds in order to be recognized as a hands-free input. Additionally, it should be appreciated that any type of data from motion-detecting sensors (such as sensor 226a-226n, which may include accelerometers, gyroscopes, and the like, as discussed herein) may be used to determine or detect displacement.

When the motion detection component 244 detects a displacement of the head-mounted computing device 220 above a threshold displacement, the motion conversion component 248 may convert the angular displacement to an instruction corresponding to one or more touch-based inputs. The motion conversion component 248 may determine an appropriate instruction based on the type of displacement. In embodiments, the motion conversion component 248 may augment the instruction with a modifier. For example, a page scrolling instruction may be augmented with a modifier of a number of pages, such as scroll 10 pages. The modifier may be based on features associated with the detected hands-free input, such as a duration of a detected displacement.

Sound processing system 250 generally facilitates the processing of audio-based input data detected by the headset device I/O 222. As such, data from sensors 226a-226n may be transmitted to the sound processing system 250 for analysis. In some aspects, data from audio input 224 may be transmitted to the sound processing system 250 for analysis. In some embodiments, sound processing system 215 250 may contain sub-components, including audio detection component including interface analyzer 212 252, audio processing component 254, and audio conversion component 256. In some aspects, sound processing system 250 may compare detected audio input with keyword cues associated with touch-based control dialogues. In aspects, sound processing system 250 may be communicatively connected with hands-free interaction system 200 through communication component 232. As such, sound processing system 250 may be located in a user device, a network, a server, or any location capable of being communicatively connected with hands-free interaction system 200.

In embodiments, because touch-based operating systems are configured to allow audio input to only one application the sound processing system, may further comprise an audio share component (not depicted). The audio share component may allow multiple processes, applications, components or the like to receive audio input simultaneously. In other words, the audio share component may allow an audio feed to continue to the touch-based operating system without further processing or analysis and continue to the audio detection component 252. Said another way, the audio share component facilitates providing an audio feed to a touch-based application without compromising the functionality of the sound processing system.

For instance, a user could run a teleconference application within the touch-based operating system and the hands-free navigation system simultaneously and the audio share component may allow the audio feed to continue to the teleconference application. Additionally, the audio share component may provide the audio detection component 252 with the audio feed. As such, in embodiments, the audio share component may duplicate the audio feed.

The audio detection component 252 generally facilitates monitoring audio input 224 and/or sensor 226a-226n to detect an audio feed. For example, the audio detection component 252 may listen to a microphone of the head-mounted computing device 220 in order to detect that signals are being received by the microphone. Continuing with this example, the audio detection component 252 may be responsible for determining that the signals received by the microphone are above a predetermined volume, which may indicate that the signals should be further processed to determine hands-free audible inputs. In embodiments, the audio detection component 252 provides detected audio feeds to the audio processing component 254.

The audio processing component 254 generally facilitates the processing of the audio feed to identify, isolate, and analyze the user's speech. In embodiments, the audio processing component 254 may use voice recognition algorithms, noise reduction algorithms, speech-to-text algorithms, machine-learning algorithms, or the like to process the audio feed. In some aspects, the audio processing component 254 may receive multiple audio feeds from the audio detection component 252. In these embodiments, the audio processing component 254 may process the multiple audio feeds to, at least partially, isolate the user's speech from background noise. It will be understood that any noise reduction algorithms, voice isolation algorithms, or any suitable algorithm or technique may be used to, at least partially, isolate the user's speech from the background. In embodiments, the audio processing component 254 may receive the audio feed, from the audio detection component 252, and identify a first audible input associated with the touch-based control dialogue by the interface analyzer 212. In embodiments, the audio processing component 254 may analyze the audio feed and compare the audio feed to the keyword cue to determine if the processed audio feed matches a keyword cue.

The audio conversion component 256 generally facilitates the conversion of an audio feed-keyword cue match to the associated control dialogue. As such, the audio conversion component 256 may receive the matching keyword cue from the audio processing component 254 and determine the control dialogue that is associated with the keyword cue.

Interface analyzer 212 generally facilitates the detection of touch-based user interaction features within the touch-based user interface 206, touch-based operating system 202, applications 208 within the touch-based user interface 206, and documents 204 within the touch-based user interface 206. As used herein, touch-based user interaction features include touch-based scrolling features (such as "swipe" features, horizontal scroll bars, vertical scroll bars, and the like), touch-based control dialogues (such as text boxes or fields, check boxes, application icons, document tools, radial buttons, and the like, for example), and more generally any element, feature, icon, command, code, extension, macro, etc. that facilitate user interaction within a touch-based user interface, operating system, application, and/or document. In aspects, the interface analyzer 212 may detect and/or identify touch-based user interaction features by scanning the source code of touch-based user interface 206, touch-based operating system 202, and/or applications 208 within the touch-based user interface 206. In aspects, interface analyzer 212 may reference keyword custom library 272 and/or user data 274 to facilitate context specific features.

In some embodiments, context analyzer 214 generally facilitates analyzing contextual data and context specific features of the hands-free interaction system 200. Contextual data may be any data relevant to the operation of the headset engine 210 or its subcomponents. By way of non-limiting example, contextual data may be user data (such as user data 274), application data (such as associated with application 208), or data received from the communication component 232, or location determiner 216. In embodiments, context analyzer 214 additionally monitors interface analyzer 212 and determines if any customized data is relevant to the current instance of the touch-based user interface. In embodiments, the context analyzer may alter the function of hands-free input determiner 240, headset engine 210 or their respective subcomponents in response to analysis. For example, in response to the interface analyzer 212 analyzing a specific instance of the touch-based user interface, context analyzer 214 may locate a custom user interface label library (such as custom keyword library 272) associated with the specific instance of the touch-based user interface. Context analyzer 214 may then communicate the custom user interface label library to sound processing system 250.

In embodiments, context analyzer 214 may use location information to alter the function of hands-free input determiner 240. For example, context analyzer 214 may analyze location data (such as Bluetooth beacon information detected by location determiner 216) associated with specific custom keyword libraries. In embodiments, context analyzer 214 may determine that specific motion-based thresholds are indicated as a result of contextual data.

In embodiments, the interface analyzer 212 may detect a compatible touch-based user interface, for example Google Android or Apple iOS, and analyze the touch-based OS to detect a touch-based command associated with the first instance of the user interface. The interface analyzer may detect, for example, that the first instance of the user interface comprises a touch-based scrolling feature. For example, the touch-based scrolling feature may comprise a touch-based scrolling feature associated with the touch-based operating system, for navigating to a different menu screen of the touch-based operating system; a touch-based scrolling feature associated with an application, for navigating to a different menu screen of the application; and/or, a touch-based scrolling feature associated with the document, for navigating to a different portion of the document.

In embodiments, when interface analyzer 212 detects a touch-based scrolling feature the headset engine 210 may activate the motion processing system 242 which calibrates the motion capture system, monitors displacement, and converts displacement to an associated touch-based scrolling feature. Once activated, the motion processing system 242 may activate the calibration control component 246. The calibration control component 246 detects an initial position of the head-mounted computing device, the initial position including an orientation of the head-mounted computing device 220 relative to one or more axes. In embodiments, the calibration control component 246 may determine the initial position of the head-mounted computing device by activating the motion detection component 244, which may employ a camera (e.g., one of sensors 226a-226n) to capture an image. The calibration control component 246 may store the image, at least temporarily, as an initial reference image for comparison against subsequent images to determine the relative movement of the head-mounted computing device 220.

Further, in embodiments, interface analyzer 212 associates the detected touch-based scrolling feature with a displacement of the head-mounted computing device 220 in a corresponding direction. For example, if interface analyzer 212 detects a touch-base scrolling feature which is associated with the touch-based OS corresponding to "swiping" from left to right within the first instance of the user interface; the interface analyzer 212 may associate a displacement to the right relative to the initial position of the head-mounted computing device 220 with the touch-based swipe from left to right. For another example, if the interface analyzer 212 detects a vertical scrollbar within the first instance of the user interface; the interface analyzer 212 may associate an angular displacement "up" relative to the initial position of the head-mounted computing device 220 with moving the vertical scrollbar up a predetermined number of scroll units. If the interface analyzer 212 detects a horizontal scrollbar within the first instance of the user interface; the interface analyzer 212 may associated angular displacement to the right relative to the initial position of the head-mounted computing device 220 with moving the horizontal scrollbar right a predetermined number of scroll units.

Further, the headset engine 210 may activate the display component 234 to display the first instance of the user interface of the touch base operating system on the display (described in more detail with reference to FIG. 2, and indicated by reference numeral 234) of the head-mounted computing device 220. In embodiments, the headset engine 210 may then activate motion detection component 244 that detects the first angular displacement of the head-mounted computing device, the first angular displacement being above a first threshold angular displacement, wherein the first threshold angular displacement is an angular displacement relative to the initial position.

Additionally, if the interface analyzer 212 detects a touch-based scrolling feature corresponding to a swipe from left to right and associated an angular displacement to the right relative to the initial position of the head-mounted computing device with the touch-based swipe from left to right, and the motion detection component 244 detects an angular displacement of the head-mounted computing device from the initial position to the right that is above the threshold; the motion conversion component 248 may determine that an instruction swiping from left to right is required. The motion conversion component 248 may then convert the angular displacement to an instruction corresponding to swipe from left to right and pass the instruction to the command generator 213. The command generator 213 generates a touch-based input corresponding to the instruction indicated by the motion conversion component 248 and executes the instruction within the touch-based user interface. It will be understood that any displacement may be detected, analyzed, and converted by the system and the preceding example is intended as an example, and not intended as a limitation.

In embodiments, the interface analyzer 212 may detect a compatible touch-based operating system and analyze the touch-based user interface to detect at least one touch-based control dialogue associated with the first instance of the user interface. For example, the touch-based control dialogue may comprise a touch-based command associated with the touch-based operating system, for enabling audio outputs or changing the audio output volume; and/or, a touch-based control dialogue associated with an application, for starting the application or selecting an application element, a text field or a "send" element, for instance. It will be understood that the preceding examples are only a small subset of potential touch-based control dialogues and not intended as a limitation.

In embodiments, when interface analyzer 212 detects a touch-based control dialogue the headset engine 210 may activate the sound processing system 250 which monitors and processes the audio input, analyzes the audio input, and converts the audio input to an associated touch-based control dialogue. Once activated, the sound processing system 250 may activate interface analyzer 212, which detects, identifies, and associates control dialogue options with keyword cues. In embodiments, interface analyzer 212 detects the touch-based control dialogues by scanning the source code associated with the first instance of the user interface at runtime and extracting features. For example, if the interface analyzer 212 detects a "button" embedded into the first instance of the user interface, the interface analyzer 212 will associate the button text with a keyword cue. In embodiments, the interface analyzer 212 may detect a customized keyword cue library associated with the first instance of the user interface stored in the memory of the hands-free computing device (such as storage 270). In embodiments, the interface analyzer 212 may detect a customized keyword cue library stored in a communicatively coupled user device (such as user device 102a). In embodiments, the interface analyzer 212 may detect a customized keyword cue library stored in a communicatively coupled data source (such as data source 104a).

The headset engine 210 activates the display component 234 to display the first instance of the user interface of the touch base operating system on the display of the head-mounted computer device. In embodiments, the headset engine 210 then activates the audio detection component 252 to detect audio received, e.g., via sensors 226a-226n or audio input 224, which passes audio input to the audio processing component 254. As used herein, reference to an audio feed can refer to either the acoustic signals captured by an audio input device or the electrical signals that are produced by the audio input element.

In response to the command generator 213 executing the instruction within the touch-based user interface, the headset engine 210 then instructs the display component 234 to display a second instance of the user interface of the touch-based operating system on the display of the head-mounted computing device.

Turning now to FIG. 4a, a block diagram is provided illustrating an exemplary motion-based hands-free interaction mode 400 that may be implemented, at least in part, by the headset described in reference to FIG. 3. In embodiments, the headset engine initializes a hands-free interaction mode 402 associated with the motion processing system 242. The hands-free interaction mode 402 may include activating the interface analyzer to detect a touch-based scrolling feature within the first instance of the user interface and associate the touch-based scrolling feature with a first angular displacement. At block 404, the initial position of the hands-free computing device is detected and an initial reference orientation is determined. In embodiments, this may be done by the calibration control component 246, as discussed with reference to FIG. 3. In embodiments, the calibration control component 246 may be reactivated by the user at any point to reset the reference orientation. For example, the user may have their head at an odd or uncomfortable position at the time the initial reference orientation is determined, such that it would be undesirable to maintain the position during hands-free navigation; the user may re-activate the calibration control component 246 so that the reference orientation may be re-determined. In embodiments, the head-mounted computing device 220 may have a button (such as physical input elements 238) that is associated with re-activating the calibration control component 246. Additionally, and/or alternatively, in embodiments, a pre-determined audio command is associated with re-activating the calibration control component.

At block 406, the display presents the first instance of the user interface. In embodiments, this is done by headset engine 210 as discussed with reference to FIG. 3. At block 408, movement of the head-mounted computer device is detected by the motion detection component 244, as described in reference to FIG. 3. At block 410, the detected movement is determined to have exceeded the angular threshold associated with the touch-based scrolling feature by the motion detection component 244, as described in reference to FIG. 3. At block 412, the detected displacement is converted into the touch-based scrolling instruction associated with the touch-based scrolling feature by the motion conversion component 248. Further, a command is generated and executed within the first instance of the touch-based interface. At block 414, in response to executing the touch-based scrolling command, a second instance of the user interface is displayed. It will be understood that method 400 may be executed in a repetitive manner as many times as desired.

In embodiments, some processes of the motion-based hands-free interaction mode may be at least partially completed by a user device (such as user device 102a) communicatively connected with the head-mounted computing device 302,220 as described in reference to FIG. 3.

Turning now to FIG. 4b, a block diagram is provided illustrating an exemplary audio-based hands-free interaction mode 416 that may be implemented, at least in part, by the headset illustrated in FIG. 3. In embodiments, the headset engine initializes a hands-free interaction mode 418 associated with the sound processing system 250. Initializing the hands-free interaction mode 418 may include activating the interface analyzer to detect at least one touch-based control dialogue within the first instance of the user interface. At block 420, the at least one touch-based control dialogue is identified and associated with a keyword cue. In embodiments, the interface analyzer may analyze the source code of an application running within the touch-based user interface and identify a name associated with the touch-based control dialogue in the application source code. The interface analyzer may then generate a keyword cue substantially similar to the name from the application source code and associate the generated keyword cue with the touch-based control dialogue. For example, if the touch-based user interface was displaying a construction blueprint in an application and the application has a touch-based control dialogue that opens a zoom feature within the application, then the interface analyzer may, in real time: access the application's source code; identify the portion of the code encoding the zoom feature; detect that the feature is named "zoom;" generate a keyword cue "zoom;" and, associate the generated keyword cue "zoom" with the touch-based control dialogue that opens the zoom feature. In embodiments, the interface analyzer may reference a predefined or custom user interface label library when associating touch-based control dialogues with keyword cues, as discussed in detail in reference to FIG. 7B.

At block 422, the display presents the first instance of the user interface. In embodiments, the headset engine 210 orchestrates the presentation of the user interface as discussed with reference to FIG. 3. In embodiments, at block 424, a graphical overlay may be simultaneously displayed over the first user interface comprising at least one visual indicator of the keyword cue the interface analyzer identified with the first user interface. In further embodiments, the visual indicators may be positioned substantially proximate to the location of the touch-based control dialogue as illustrated and discussed with reference to FIG. 8B.

At block 426, an audible input is detected by the headset. In embodiments, the audible input may be initially detected by the audio input 224, for instance the phrase "zoom" spoken by the user. The audio input 224 may then convert the spoken phrase "zoom" into an audio feed and pass the audio feed to audio detection component 252. The audio detection component 252 may then activate the audio processing component 254.

At block 428, the audio feed is processed and analyzed to determine if the audible input matches a keyword cue and thus a touch-based control dialogue. In embodiments, the audio processing component 254 may use voice recognition algorithms, noise reduction algorithms, speech-to-text algorithms, machine-learning algorithms, or the like to process the audio feed. For example, the audio feed may be processed to isolate the phrase "zoom" spoken by the user from any ambient, incidental, or background noise. The audio processing component 254 may then analyze the processed audio feed and compare the processed audio feed to the keyword cue to determine if the processed audio feed matches a keyword cue.

At block 430, a touch-based command is generated corresponding to the touch-based control dialogue associated with the detected keyword cue, and the command is executed within the first instance of the touch-based user interface. In other words, when the audio processing component determines that the audio feed matches a keyword cue, the audio conversion component converts the matched keyword cue into the associated control dialogue. The audio conversion component then passes the control dialogue to the command generator, which generates a command equivalent to the touch-based control dialogue. The generated command is then executed by the headset engine within the touch-based user interface. For example, once the audio processing component matches the phrase "zoom" to the keyword cue "zoom," the audio conversion component converts the keyword cue "zoom" into an instruction equivalent to select zoom control dialogue. The instruction is then passed to the command generator, which generates a command equivalent to a touch-based user selection of the zoom touch-based control dialogue. The command is then executed by the headset engine within the touch-based user interface, which results in the zoom feature activating. It will be understood that method 416 may be executed in a repetitive manner as many times as desired.

Figure 4C:
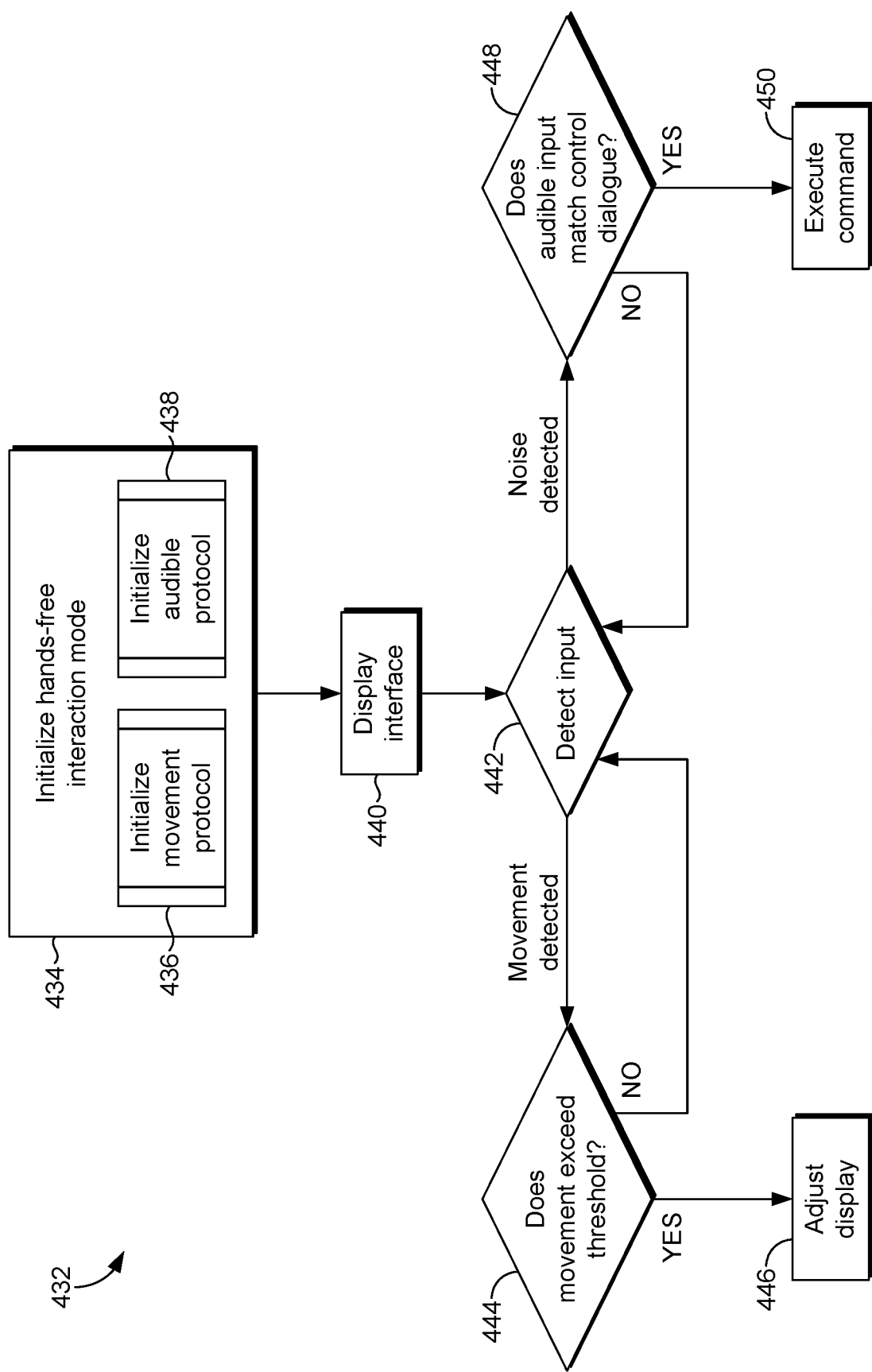
FIG. 4C depicts an exemplary motion- and audio-based hands-free interaction method, in accordance with aspects hereof.

Turning now to FIG. 4c, a block diagram is provided illustrating an exemplary motion- and audio-based hands-free interaction mode that may be implemented, at least in part, by the headset illustrated in FIG. 3. The hands-free interaction mode is initiated in block 440. In embodiments, the interface analyzer, as discussed in reference to FIG. 3, analyzes the touch-based OS to detect at least one touch-based command associated with the first instance of the user interface. For example, the interface analyzer may detect that the first instance of the user interface comprises a touched-based scrolling feature, for navigating to a different menu screen of the touch-based operating system for instance and the interface analyzer 212 may also detect that the first instance of the user interface comprises a touch-based control dialogue, for opening an application installed in the touched-based operating system for instance.

The headset engine 210 may then initialize the hands-free movement protocol 436 and initialize the hands-free audio protocol 438. In embodiments, the hands-free movement protocol 436 may comprise some, part, or all of the processes of the motion-based hands-free interaction mode 400. For example, the headset engine 210 may activate the calibration control component 246 to determine an initial position of the head-mounted computing device, the initial position including an orientation of the head-mounted computing device relative to one or more axes. In embodiments, the hands-free audio protocol 438 may comprise some, part, all, or alternative processes of the audio-based hands-free interaction mode 416. For example, the headset engine may activate the control dialogue detection module to enable audio-based hands-free navigation. It will be understood that the headset engine may initialize the hands-free movement protocol 436 and the hands-free audio protocol 438 in any order or simultaneously.

Once the initial reference orientation of the headset is determined and the touch-based control dialogue(s) are associated with keyword cues, the first instance of the touch-based user interface is displayed, as shown at block 440. At block 442, the motion detection component and the audio detection component monitor, detect, and analyze input data from the headset I/O system, as described in reference to FIG. 4A and FIG. 4B, respectively.

At block 444, when movement is detected, the motion detection component determines if the movement exceeds the relevant threshold, as discussed with reference to block 410. If the relevant threshold is exceeded, the display is adjusted at block 446, as discussed with reference to blocks 412 and 414. If the relevant threshold is not exceeded, the system returns to block 442.

At block 448, when audio input is detected, the audio processing component determines if the audio input matches a keyword cue, as discussed with reference to block 428. If the audio input matches a keyword cue, the touch-based command equivalent to the associated control dialogue is executed at block 450, as discussed with reference to block 430. It will be understood that method 432 may be executed in a repetitive manner as many times as desired.

Figure 5:
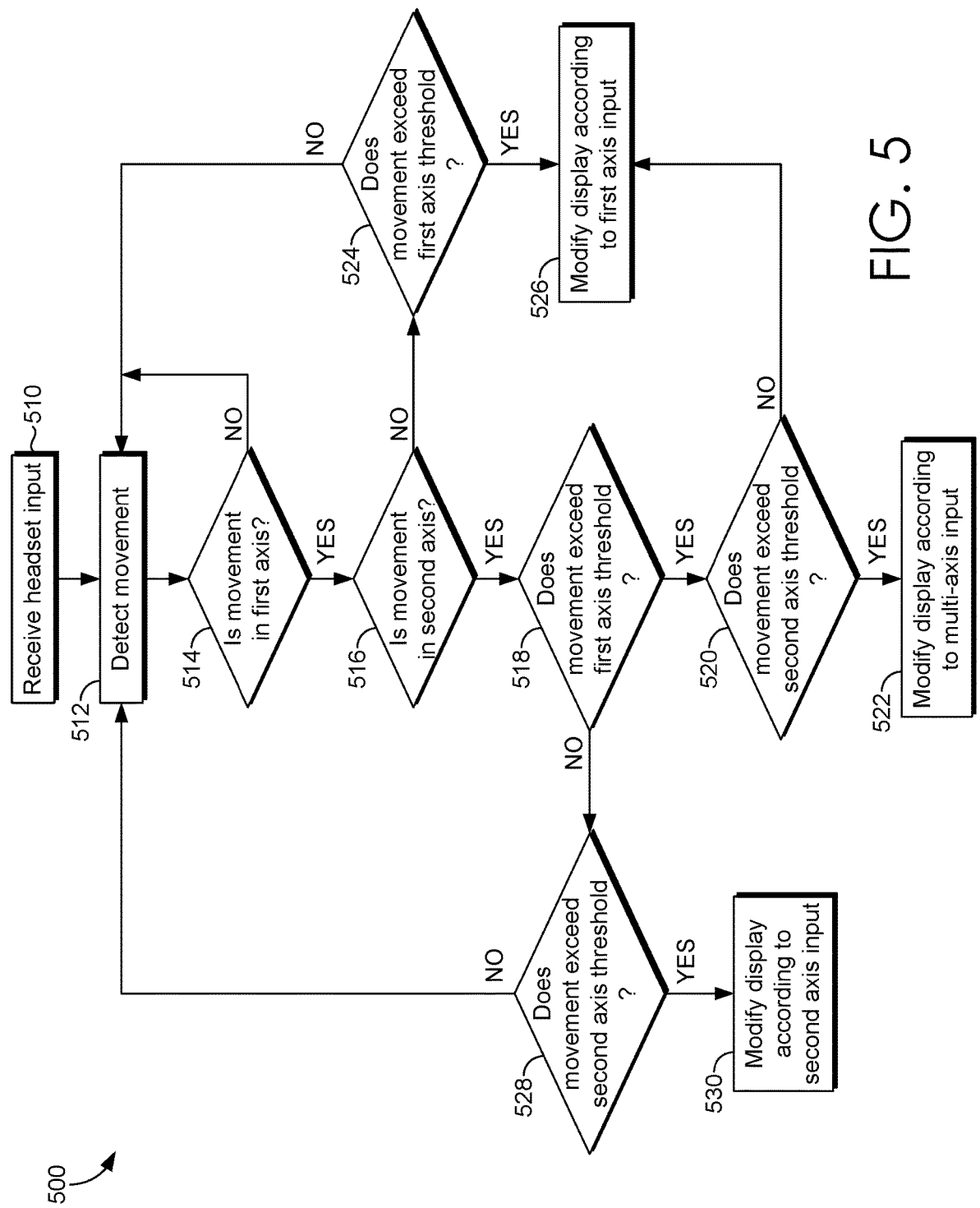
FIG. 5 depicts an exemplary method for determining multi-axis motion-based interactions, in accordance with aspects hereof.

Turning now to FIG. 5, a block diagram is provided showing an exemplary multi-axis motion-based method 500 that facilitates hands-free interaction with a touch-based operating system. In other words, method 500 facilitates simple and complex motion-based hands-free interaction with a touch-based operating system when utilized with a compatible headset. As an illustrative example, a user wearing a compatible headset initializes the hands-free navigation interface at block 510. The initial reference orientation of the headset is determined, as previously discussed, to be equivalent to facing forward in a neutral position. At block 512, the headset detects movement. For instance, the user turns their head from neutral to the right and up simultaneously. At block 514, the system determines if the movement is in a first axis. For example, the movement in the first axis may be a rotation about the z-axis, from the initial reference position toward the x-axis (to the right of a user). In other words, the system may detect the user turned (rotated) their head from facing forward to the right. At block 516, the system determines if the movement also occurred in a second axis. For example, the movement in the second axis may be a rotation about the x-axis, from the initial reference position toward the z-axis (upward from the perspective of a wearer). In other words, the system may detect the user also (rotated) their head from a position substantially parallel to the y-axis toward the z-axis.

At block 518, the system determines if the movement in the first axis exceeded the first axis threshold. The first axis threshold may be, for example, predetermined to be +/−10 degrees from the initial reference position. If the system detects an displacement in the first axis beyond +/−10 degrees, the system determines that the threshold was exceeded. If the system detects a displacement in the first axis below +/−10 degrees, the system determines that the threshold was not exceeded. For example, if the user turned their head to the right by 20 degrees, the system would determine that the first axis threshold was exceeded.

At block 520, the system determines if the movement in the second axis exceeded the second axis threshold. The second axis threshold may be, for example, predetermined to be +/−10 degrees from the initial reference position. If the system detects a displacement in the second axis beyond +/−10 degrees, the system determines that the threshold was exceeded. If the system detects displacement in the second axis below +/−10 degrees, the system determines that the threshold was not exceeded. For example, if the user turned their head up by 20 degrees, the system would determine that the second axis threshold was exceeded.

At block 522, the system executes the touch-based scrolling feature associated with the multi-axis input and displays a second instance of the touch-based user interface. In embodiments, the multi-axis input may represent two independent touch-based scrolling features. Continuing with the previous example, the multi-axis input—right and up—may correspond to moving a horizontal scroll bar to the right a predetermined number of scrolling units and moving a vertical scroll bar up a predetermined number of scrolling units. In embodiments, the multi-axis input may represent a single touch-based scrolling feature. For example, the multi-axis input—right and up—may correspond to moving a vertical scroll bar a number of scrolling units equivalent to a full page of the displayed document.

Returning to block 516, if movement is only detected in the first axis the system determines if the movement exceeded the first axis threshold, at block 524. If the movement did not exceed the first axis threshold, the system returns to block 512. If the movement did exceed the first axis threshold, the system executes the touch-based scrolling feature associated with the first axis input and displays a second instance of the touch-based user interface, at block 526.

Returning to block 518, if the detected movement does not exceed the threshold of the first axis the system proceeds to block 528. At block 528, the system determines if the movement exceeded the threshold of the second axis. If the movement did not exceed the second axis threshold, the system returns to block 512. If the movement did exceed the second axis threshold, the system executes the touch-based scrolling feature associated with the second axis input and displays a second instance of the touch-based user interface, at block 530.

It will be understood that the examples provided in reference to exemplary method 500 represent only a subset of the possible multi-axis inputs and associated touch-based scrolling commands within the scope of the present disclosure; as such the examples are merely illustrative and not meant to be interpreted as limiting.

Figure 6A:
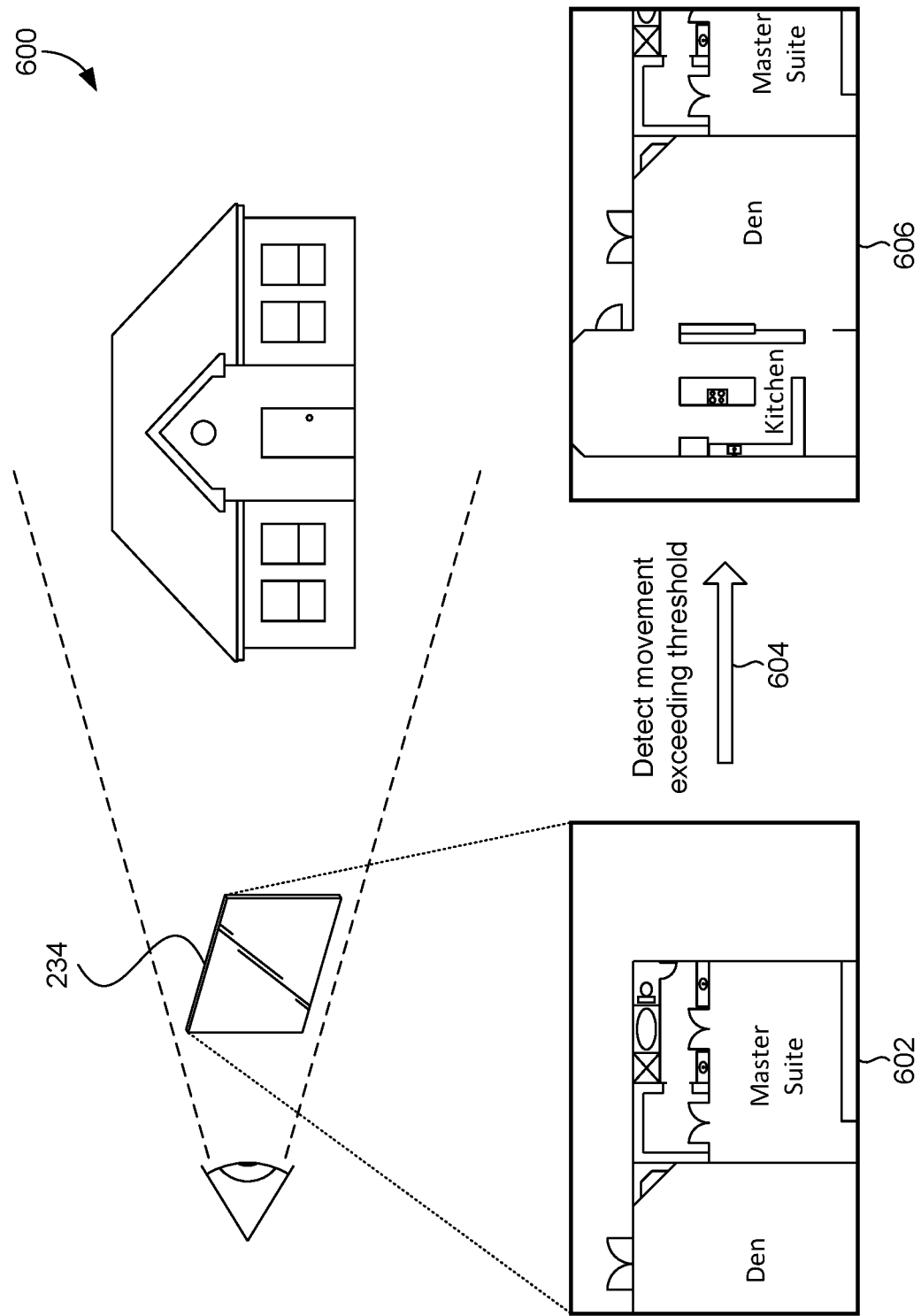
FIG. 6A depicts an exemplary user interaction, in accordance with aspects hereof.

Turning now to FIG. 6A, an exemplary figure illustrating a possible use case is provided consistent with embodiments of the disclosed invention. It will be understood that FIG. 6A includes only a subset of the embodiment's systems and components to ensure clarity of the figure. After initializing the hands-free navigation interface, a user wearing a compatible headset is presented, through a display, with a first portion of the blueprint 602 associated with a building the user is constructing. After inspecting the areas of the building 600 associated with the first portion of the blueprint 602, the user may turn their head to the left. At 604, the system detects the movement in the first axis, in this case the x-axis, and determines that the movement in the first axis exceeded the first axis threshold. The system then converts the movement to a command associated with the touch-based scrolling feature equivalent to scrolling to the left. The system then executes the command within the touch-based user interface. The system then displays the second instance of the touch-based user interface. Here, the command results in scrolling left within the displayed blueprint a predetermined distance and the display shows the second portion of the blueprint 606.

Figure 6B:
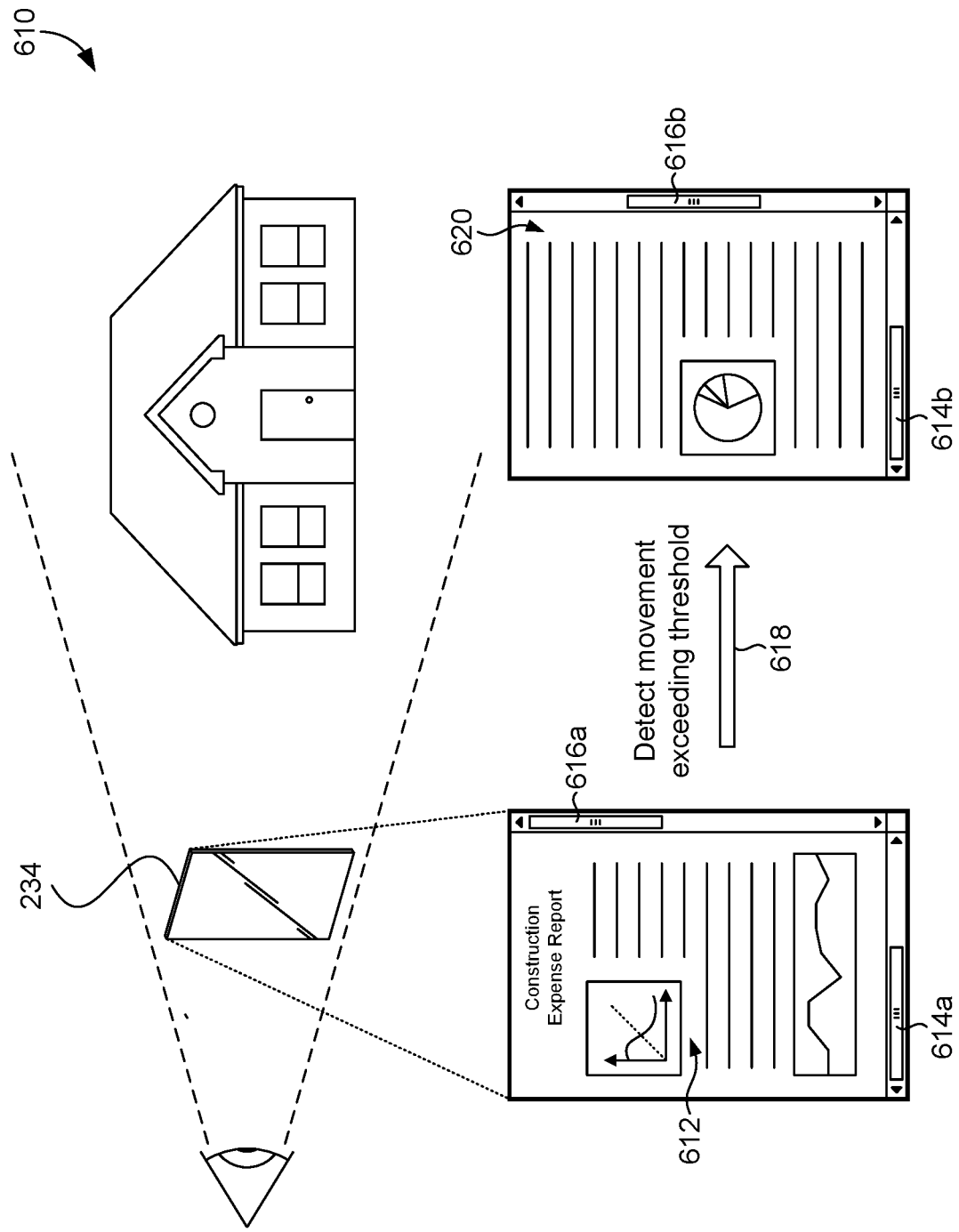
FIG. 6B depicts an exemplary user interaction, in accordance with aspects hereof.

Turning now to FIG. 6B, an exemplary figure illustrating another possible use case is provided consistent with embodiments of the disclosed invention. It will be understood that FIG. 6B includes only a subset of the embodiment's systems and components to ensure clarity of the figure. After initializing the hands-free navigation interface and detecting a vertical scroll bar at scroll bar location 616a and a horizontal scroll bar at scroll bar location 614a, a user wearing a compatible headset may be presented, through a display, with the first page of an expense report 612 associated with a building the user is constructing. After reviewing the first page of the expense report, 612 the user may rotate their head down. At 618, the headset may detect the angular displacement about the x-axis, and determine that the motion in the first axis exceeds the first axis threshold. The system then converts the movement to a command associated with moving the vertical scroll bar from scroll bar location 616a down a predetermined distance to scroll bar location 616b. The system then executes the command within the touch-based user interface. The system then displays the second instance of the touch-based user interface. Here, the display now shows the second page of the expense report 620.

Figure 7A:
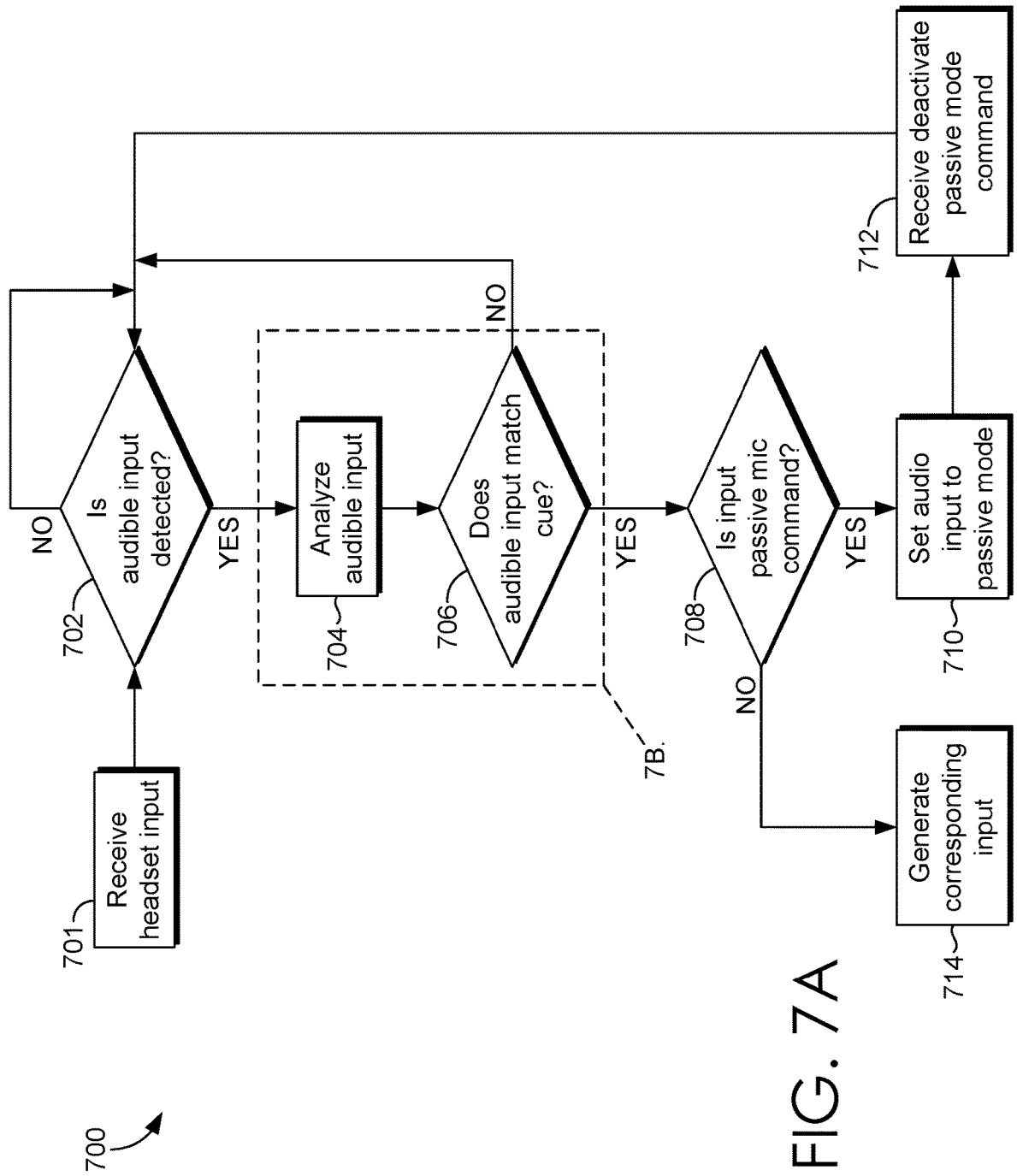
FIG. 7A depicts an exemplary method for determining audio-based input, in accordance with aspects hereof.

Turning now to FIG. 7A, a flow diagram is provided that illustrates a method 700 that generally facilitates the accurate conversion of a voice input into an executed command within the touch-based user interface of the touch-based operating system. Initially, as shown at block 701, the method includes receiving input data from a headset sensor. Further, at block 702, the method may include determining whether the received input data is an audio feed. For example, audio input associated with at a touch-based control dialogue may be detected. In some aspects, at block 704, the method comprises analyzing the audio input. In embodiments, the audio feed is processed using computer-based speech recognition techniques to identify the audio input. At block 706, the method may determine whether the analyzed audio input matches a keyword cue. In embodiments, the analyzed audio input is compared to generated keyword cues that are associated with touch-based control dialogues by a control dialogue detector. It shall be understood that any voice-to-text matching algorithm or algorithms may be used to determine if the audio input matches a keyword cue. In embodiments, the touch-based control dialogues may be associated with a mobile application executing in the touch-based operating system. In embodiments, at block 708, the method comprises determining whether the keyword cue that matches the audio input corresponds to an instruction to suspend the hands-free interaction mode. For example, the method may determine if the keyword cue corresponds to an instruction to set the audio input component to a passive mode. In this context, a passive mode refers to (at least temporarily) pausing analysis of headset sensors and/or audio input systems within the hands-free interaction mode. However, in embodiments the headset sensors and/or audio input systems remain active for use with other processes. In other words, headset sensors and/or audio input systems may continue to transmit data to an application running within the touch-based operating system. For example, after using the hands-free interaction mode to answer a video chat request from a video chat application, a user may put the hands-free interaction mode in passive mode by speaking the keyword cue associated with the passive mode, but continue to use the headset microphone and camera within the video chat application.

In embodiments of the method, at block 710, in response to determining that the keyword cue is associated with the instruction to set the audio input to passive mode, the audio input is set to a passive mode. In some embodiments, at block 712, a command is received to deactivate the passive mode and the method returns to block 702. In embodiments, the command to deactivate the passive mode may be associated with a physical input element (such as a button) located on the headset. Returning to block 708, in embodiments, when the keyword cue is anything other than the passive mode instruction, the touch-based control dialogue command is generated and executed within the touch-based user interface.

Figure 7B:
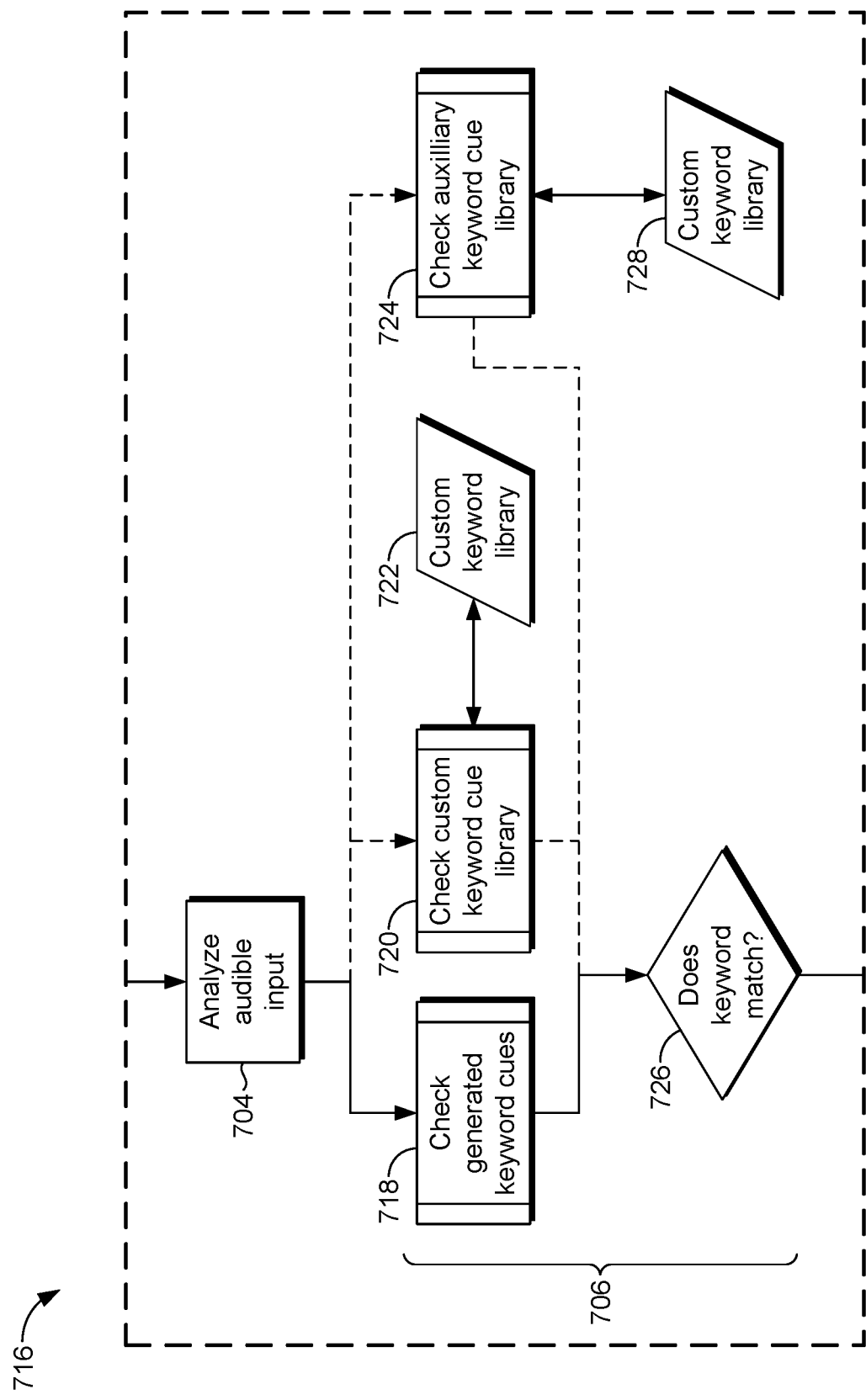
FIG. 7B depicts an enlarged portion the method of FIG. 7A that illustrates an exemplary method for determining audio-based input, in accordance with aspects hereof.

Turning now to FIG. 7B, a portion of the flow diagram depicted in FIG. 7A is provided that illustrates an exemplary method 716 for comparing the audio input to keyword cues. The exemplary method 716 generally facilitates comparing the audio input to generated keyword cues, custom user interface labels, and auxiliary keyword cues. As discussed in reference to FIG. 7A, at block 704, the method comprises analyzing the audio input. At block 718, the analyzed audio input may be compared with keyword cues generated by the interface analyzer. As discussed previously, the keyword cues may be identified and generated by the interface analyzer by analyzing the source code associated with the first instance of the user interface.

In some embodiments, at block 720, the analyzed audio input may be compared with a custom user interface label library 722. As such, a user may create customized keywords cues and associate the customized keyword cues with touch-based control dialogues. In embodiments, this custom keyword library may supersede, at least partially, the keyword cues generated by the interface analyzer. In embodiments, the keyword cue may be a customized or predetermined keyword cue-control dialogue combinations associated with a specific first instance of the user interface.

In embodiments, at block 724, the analyzed audio input may be compared with an auxiliary keyword cue library 728. In embodiments, the auxiliary keyword cue library may comprise a table comprising a plurality of keyword cues associated with a touch-based control dialogue. For example, if the interface analyzer identifies a touch-based control dialogue that is unpronounceable, the interface analyzer may automatically substitute at least one auxiliary keyword cue from the auxiliary keyword cue library that is associated with the unpronounceable control dialogue. Additionally, and/or alternatively, if the first instance of the touch-based user interface contains multiple touch-based control dialogues that result in substantially similar generated keyword cues, the auxiliary keyword cue library may provide alternate keyword cues in the same manner.

Figure 8A:
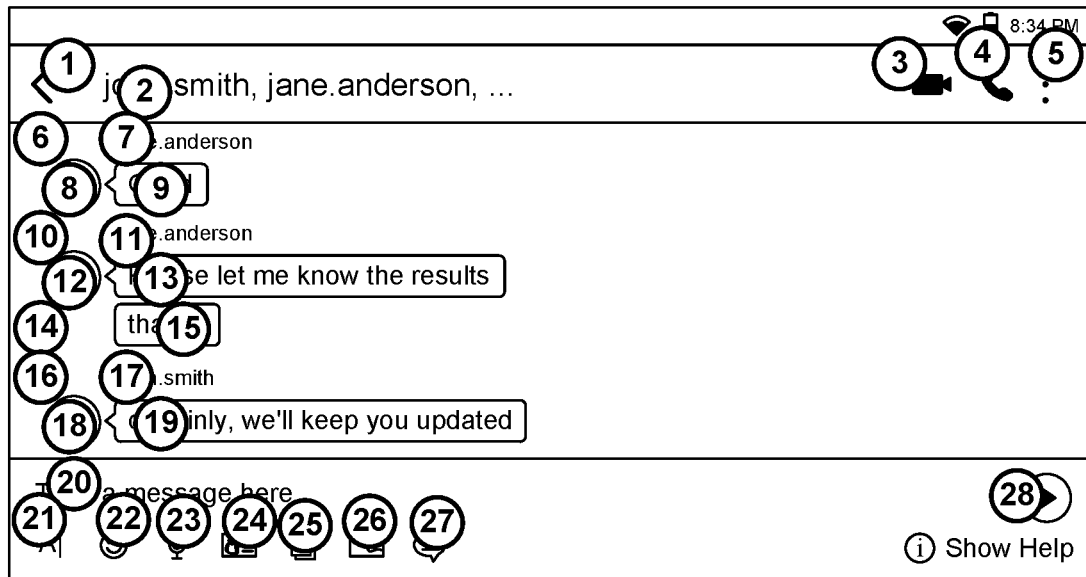
FIG. 8A depicts an exemplary method for identification of control dialogues in an exemplary touch-based user interface, in accordance with aspects hereof.

Turning now to FIG. 8A, an exemplary touch-based user interface is provided showing exemplary instances of detected control dialogues. In other words, 1-28 indicate interface features that may be identified as touch-based control dialogues. In embodiments, interface analyzer 212 may detect interface features 1-28 by analyzing the source code associated with the user interface. In the depicted example, interface analyzer 212 may analyze the source code associated with the application running within the touch-based operating system that is currently presented by the touch-based user interface. However, interface analyzer 212 may also analyze source code associated with the touch-based operating system itself or any other code present.

In embodiments, once interface features (such as interface features 1-28) are identified as touch-based control dialogues by the interface analyzer 212, the interface analyzer 212 may analyze the control dialogues, generate keyword cues, and associate the keyword cues with the control dialogues. In embodiments, the interface analyzer 212 may reanalyze the relevant source code. In embodiments, the interface analyzer 212 may provide at least partial analysis of the relevant source code to the interface analyzer 212.

Figure 8B:
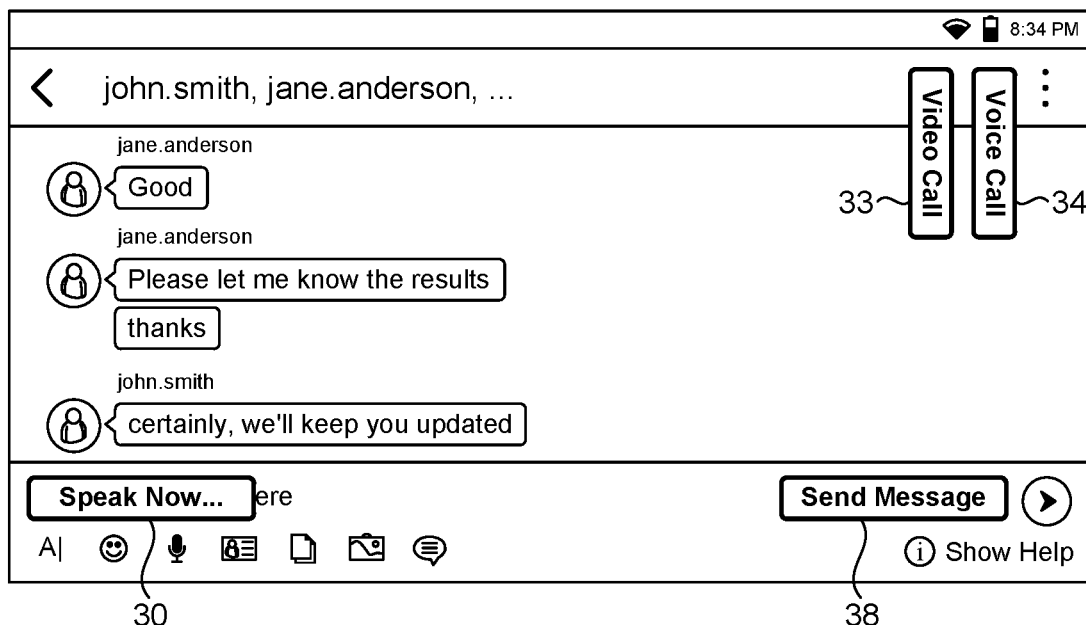
FIG. 8B depicts exemplary keyword cue overlays associated with touch-based control dialogues in an exemplary touch-based user interface, in accordance with aspects hereof.

Turning now to FIG. 8b, an exemplary touch-based user interface with keyword cue overlays is depicted. In other words, 30-38 indicate display overlays that may be presented to the user to assist in the use of audio-based hands-free navigation with embodiments of the present disclosure. In embodiments, the overlays may be automatically displayed by the headset engine 210 based on the analysis of the touch-based user interface by the interface analyzer 212. In embodiments, the overlays may be automatically generated by the multiple subcomponents of the headset engine 210. For example, interface analyzer 212 may detect interface features (such as interface features 1-28 from FIG. 8A), identify the interface features as control dialogues, and activate audio detection component 252; audio detection component 252 may analyze the control dialogues, generate keyword cues, and associate the keyword cues with the control dialogues; headset engine 210 may detect the associations, generate overlays containing keyword cues, and cause the overlays to be superimposed over the display of the touch-based user interface (such as overlays 30-38). It will be understood that the preceding is merely used as an example method for creating overlays consistent with the disclosure, and not meant as a limitation.

However, the automated creation of overlays may result in more control dialogues than are necessary, useful, or desirable being presented in overlays in a given instance of the touch-based user interface. In other words, a purely automatic generation of keyword cue overlays may inadvertently hinder hands-free navigation of the touch-based user interface. Thus, in embodiments, the overlays may be automatically displayed by the headset engine 210 based on customized preferences. In such an embodiment, the headset engine 210 may identify predetermined overlay templates associated with instances of the touch-based user interface in a custom library.

In embodiments, the function of the control dialogues may be determined by the headset engine 210, and/or its subcomponents, and overlays may be generated only for those associated keyword cues that are determined to be relevant to the user. In embodiments, this determination may be done by context analyzer 214 based on contextual data. In embodiments, this determination may be done, at least partially, based on user preferences (for example user preferences stored in user data 274).

Figure 9:
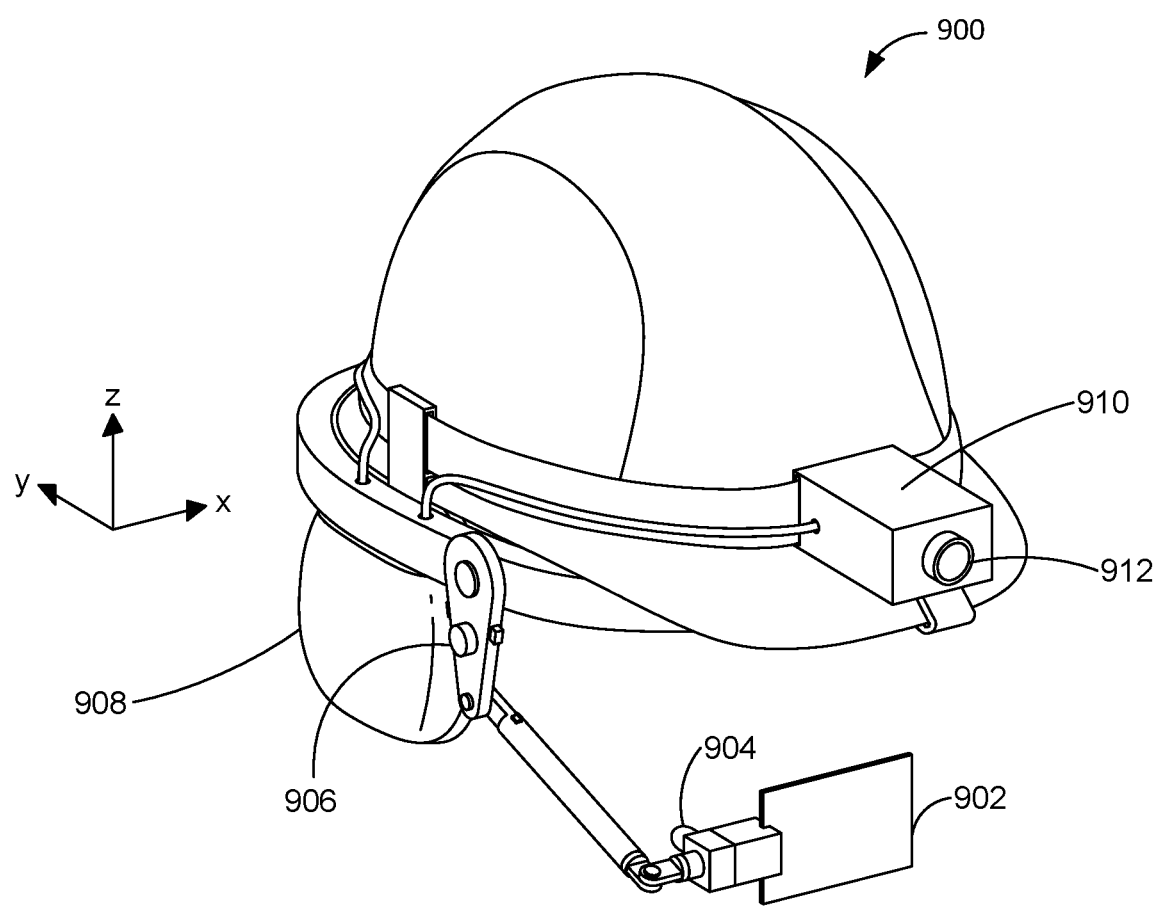
FIG. 9 depicts an exemplary head-mounted computing device with an exemplary reference frame, in accordance with aspects hereof.

Turning now to FIG. 9, an exemplary head-mounted computing device 900 is depicted consistent with some embodiments of the present disclosure. Head-mounted computing device 900 generally facilitates hands-free interaction with the touch-based user interface of a touch-based operating system. It will be understood that while exemplary head-mounted computing device 900 is depicted with various sensors the location and number of sensors may vary in embodiments without departing from the scope of this disclosure. In embodiments, head-mounted computing device 900 may comprise multiple sensors for sensing motion and audio, and components for displaying the touch-based user interface to the user. For example, exemplar display 902 generally facilitates displaying the touch-based user interface to the user. In embodiments, display 902 may be configured with head-mounted computing device 900 such that display 902 may present for display the touch-based user interface. In embodiments, display 902 may additionally be configured to display keyword cue overlays, as described above. In embodiments, display 902 may be, at least, partially translucent such that a user may look through display 902 and perceive both the displayed touch-based user interface and the environment. In embodiments, display 902 may be a monocular display. In embodiments display 902 may be a binocular display. However, it will be understood that any display may be used in embodiments of the disclosed invention without departing from the scope of this disclosure. In embodiments, display 902 may be configured to communicate with at least headset device I/O 222.

Exemplary sensor 904 generally facilitates the capture of audio input. In embodiments, sensor 904 may be a directional microphone. In embodiments, sensor 904 may be an omnidirectional microphone. In embodiments not depicted, sensor 904 may further comprise multiple microphones located at various points of head-mounted computing device 900 configured such that ambient noise may be captured and ultimately used to aid in processing and analysis of user audio inputs. It will be understood that sensor 904 may be any sensor or system of sensors capable of perceiving audio input and converting audio input into an audio feed without departing from the scope of this disclosure. In embodiments, exemplary sensor 904 may be configured to communicate with hands-free input determiner 240 and its subsystems.

Exemplary physical input sensor 906 generally provides an input component that generally facilitates the reactivation of various hands-free navigation features. In embodiments, physical input sensor 906 may be configured to signal hands-free input determiner 240 to reactivate audio-based commands after a passive command has been issued, as discussed in relation to FIG. 7A. In embodiments, physical input 906 may be configured to signal hands-free input determiner 240 to recalibrate the reference orientation of the headset as discussed above. In embodiments, physical input sensor 906 may comprise multiple physical input sensors such that a first sensor may be configured to signal hands-free input determiner 240 to reactivate audio-based commands and a second sensor may be configured to signal hands-free input determiner 240 to recalibrate the reference orientation. It will be understood that physical input sensor 906 may be any sensor capable of detecting physical interaction without departing from the scope of this disclosure.

Exemplary audio output 908 generally provides audio output from the head-mounted computing device 900 to the user. It will be understood that any audio output component or components capable of producing sound in response to electrical input (such as a speaker) may be used in embodiments without departing from the scope of this disclosure. In embodiments, audio output 902 may be configured to communicate with at least headset device I/O 222.

Exemplary motion sensor 910 generally facilitates motion detection for the motion processing systems discussed above. As used herein, a motion sensor may comprise at least one accelerometer, multi-axis accelerometer, magnetometer, gyroscope, capacitive transducer, potentiometer, resistive transducer, synchro, or any similar sensor capable of detecting motion in at least one axis. In embodiments, motion sensor 910 may comprise at least one motion sensor. In embodiments, motion sensor 910 may comprise a plurality a motion sensors. In embodiments, motion sensor 910 may be configured to communicate with hands-free input determiner 240 and its subsystems.

In embodiments, exemplary sensor 912 generally facilities motion determination. In embodiments, sensor 912 may be a digital sensor that is sensitive to light configured to capture images periodically (such as at 60 frames/sec or at any predetermined rate). In embodiments, image capture component 912 may be a digital sensor that is sensitive to light configured to capture images continuously. In embodiments, sensor 912 may be configured to communicate with hands-free input determiner 240 and its subsystems. It will be understood that exemplary sensor 912 may include any sensor capable of capturing digital images (such as a camera, video camera, or the like) may be used in embodiments without departing from the scope of this disclosure.

As referred to herein, displacement may refer to any change in position of the headset (such as head-mounted computing device 900) relative to three axes and in nine degrees of freedom. This may include, but is not limited to, translation in or rotation about any of three axes. It is noted that terminology used in relation to displacement in three-dimensional space varies widely by field (for example aviation, biomechanics, and computer science) and may vary widely in common usage. To that end, every attempt has been made to clarify and simplify portions of this description describing movement, displacement, rotation, and/or angular displacement; however, unless explicitly stated to the contrary, each example is meant to provide context and not meant to be limiting to the disclosure.

For example, translation in the x-axis may be referred to as moving right or moving left. However, it will be understood that this may also be considered equivalent to moving from the origin—positive (right) or negative (left)—in the lateral axis. Rotation (angular displacement) about the x-axis may be referred to as rotating up or down. However, it will be understood that this may also be considered equivalent to pitch up or down. Thus, for example, moving right while rotating up will be understood as moving from the origin toward positive values in the lateral axis while pitching up.

Translation in the y-axis may be referred to as moving forward or backward. However, it will be understood that this may also be considered equivalent to moving from the origin—positive (forward) or negative (backward)—in the longitudinal axis. Rotation (angular displacement) about the y-axis may be referred to as tilting left or right. However, it will be understood that this may also be considered equivalent to roll left (counter-clock wise) or right (clock-wise). Thus, for example, moving forward while tilting left will be understood as moving from the origin toward positive values in the longitudinal axis while rolling left.

Translation in the z-axis may be referred to as moving up or down. However, this may also be considered equivalent to moving from the origin—positive (up) or negative (down)—in the vertical axis. Rotation (angular displacement) about the z-axis may be referred to as turning left or right. However, it will be understood that this may also be considered equivalent to yaw left or right. Thus, for example, moving up while turning left will be understood as moving from the origin toward positive values in the vertical axis while yawing left.

Figure 10:
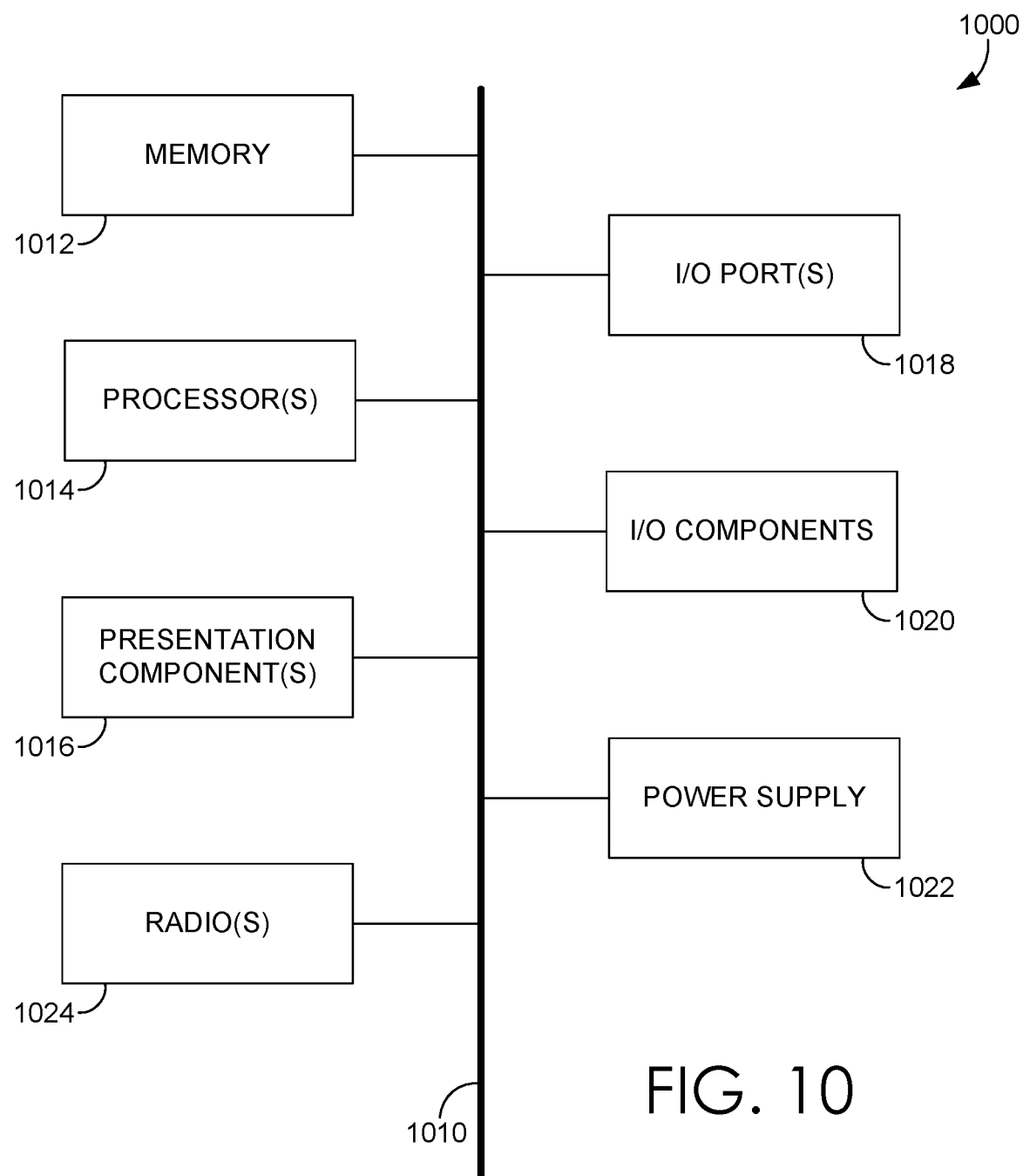
FIG. 10 depicts an exemplary computing device, in accordance with aspects hereof.

Having described various embodiments of the disclosure, an exemplary computing environment suitable for implementing embodiments of the disclosure is now described. With reference to FIG. 10, an exemplary computing device is provided and referred to generally as computing device 1000. The computing device 1000 is but one example of a suitable computing environment and is not intended to suggest any limitation as to the scope of use or functionality of the disclosure. Neither should the computing device 1000 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 10, computing device 1000 includes a bus 1010 that directly or indirectly couples the following devices: memory 1012, one or more processors 1014, one or more presentation components 1016, one or more input/output (I/O) ports 1018, one or more I/O components 1020, and an illustrative power supply 1022. Bus 1010 represents what may be one or more busses (such as an address bus, data bus, or combination thereof). Although the various blocks of FIG. 10 are shown with lines for the sake of clarity, in reality, these blocks represent logical, not necessarily actual, components. For example, one may consider a presentation component such as a display device to be an I/O component. Also, processors have memory, so the memory 1012 and the one or more processors 1014 may or may not comprise separate or distinct components. The inventors hereof recognize that such is the nature of the art and reiterate that the diagram of FIG. 10 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 10 and with reference to "computing device."

Computing device 1000 typically includes a variety of computer-readable media. Computer-readable media can be any available media that can be accessed by computing device 1000 and include both volatile and nonvolatile media, removable and non-removable media. By way of example, and not limitation, computer-readable media may comprise computer storage media and communication media. Computer storage media include both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, and the like. Computing device 1000 includes one or more processors 1014 that read data from various entities such as memory 1012 or I/O components 1020. Presentation component(s) 1016 presents data indications to a user or other device. Exemplary presentation components include a display device, speaker, printing component, vibrating component, and the like.

The I/O ports 1018 allow computing device 1000 to be logically coupled to other devices, including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 1000 to render immersive augmented reality or virtual reality.

Some embodiments of computing device 1000 may include one or more radio(s) 1024 (or similar wireless communication components). The radio 1024 transmits and receives radio or wireless communications. The computing device 1000 may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Figure 11:
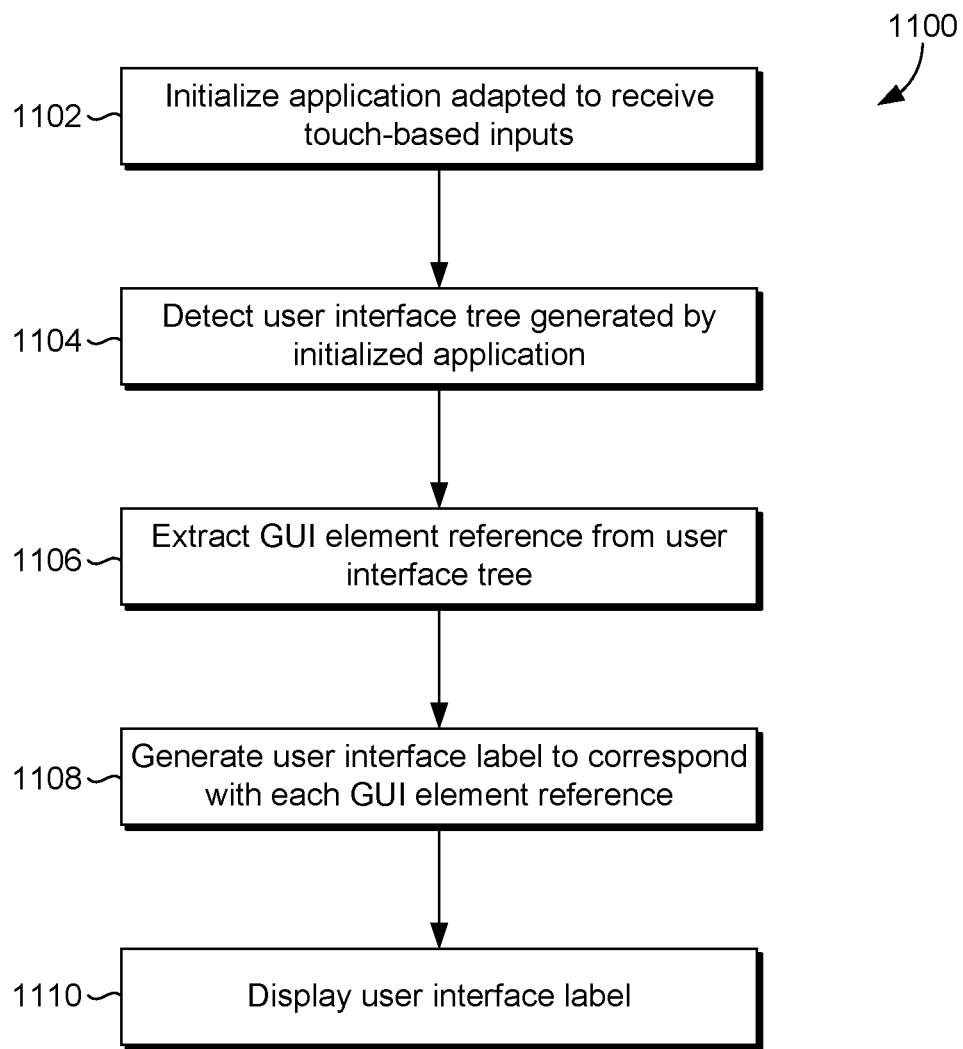
FIG. 11 depicts an exemplary method for customizing user interfaces of binary applications.

Turning now to FIG. 11, a flow diagram is provided that illustrates an exemplary method 1100 for customizing the user interfaces of binary applications consistent with some embodiments of the present disclosure. This exemplary method generally facilitates the hands-free manipulation of a touch-based application running on a touch-based operating system. At block 1102, a touch-based application adapted to receive touch-based inputs is initialized on a touch-based operating system. Such a touch-based operating system may be located on a mobile device, such as a cellular phone, tablet, PDA, touch-enabled PC, or the like. Touch-based inputs include those discussed herein and include without limitation: tapping, swiping, or any other gesture normally used by an operator of a touch-based application running on a touch-based operating system. It should be appreciated that the method 1100 may also be carried out as a system or by instructions on a non-transitory computer storage medium to carry out a similar method.

In embodiments, at block 1104, a user interface tree generated by the initialized application is detected. The user interface tree may contain one or more GUI element references. Each GUI element reference provides instructions to the touch-based operating system to display a GUI element. A GUI element may be a button, checkbox, or any other touch-selectable object. The user interface tree may contain multiple GUI element references, and may therefore provide instructions for the display of multiple GUI elements at any given time.

At block 1106, a GUI element reference may be extracted from the user interface tree. In embodiments, the GUI element reference is obtained by interrogating the user interface tree for instructions by the source-code to display touch-based objects on the touch-based user interface of the touch-based operating system.

In some embodiments, at block 1108, a user interface label may be generated for each of the at least one GUI element reference extracted from the use interface tree. The user interface label may be a number or text. User interface labels may be automatically determined or the result of a customized index. Automatically determined user interface labels may be provided by assigning a sequentially increasing numeric value to each GUI element reference, as seen in FIGS. 8A and 13C. Additionally, and/or alternatively, text-based user interface labels may be automatically extracted from the GUI element reference, as seen in FIGS. 8B and 13B. Additionally, and/or alternatively, each user interface label corresponding to a GUI reference element is generated based on a customized index that includes a set of custom user interface labels. In some embodiments, the customized index may be an XML file, a text file, or a database and may be stored on a hands-free device such as a head-mounted device or may be stored on the touch-based operating system running the touch-based application.

In some embodiments, the customized index may be created using traditional coding or scripting techniques on a computing device external to the touch-based operating system and the hands-free operating system. In such a case, the customized index may be cached/loaded/ran/installed on at least one of the touch-based and hands-free operating systems. In other embodiments, a user of the hands-free device may create the customized index, using said hands-free device. Such an embodiment may display the one or more extracted GUI elements to a user on either the hands-free or touch-based operating system, or both, to facilitate the generation of the customized index. The user may input a user interface label, using any of the hands-free controls discussed herein, to correlate with each of the one or more extracted GUI elements. The user-created user interface labels may then be aggregated and stored to generate the customized index. In some embodiments, the customized index may be user-specific, that is, that the user interface labels are stored and recalled for only the user that created the customized index. In other embodiments, the customized index may be usable or the default display option for all users.

Returning to FIG. 11, at block 1110, the one or more user interface labels are displayed. Each user interface label may correlate to one GUI element reference and each GUI element reference may correlate to one user interface label. The one or more user interface labels may be displayed on the display of a hands-free device in proximity to the touch-interactive object to which the GUI element reference corresponds. In some embodiments, the user interface labels may be displayed only on the hands-free device; in other embodiments, the user interface labels may additionally and/or alternatively be displayed on the touch-based user interface of the touch-based operating system. In embodiments, the user interface labels may be displayed via an overlay displayed on the screen of the hands-free device, the overlay being placed above the displayed application executed by the touch-based operating system, the displayed application being the voice-controlled by employing various embodiments described herein.

Figure 12:
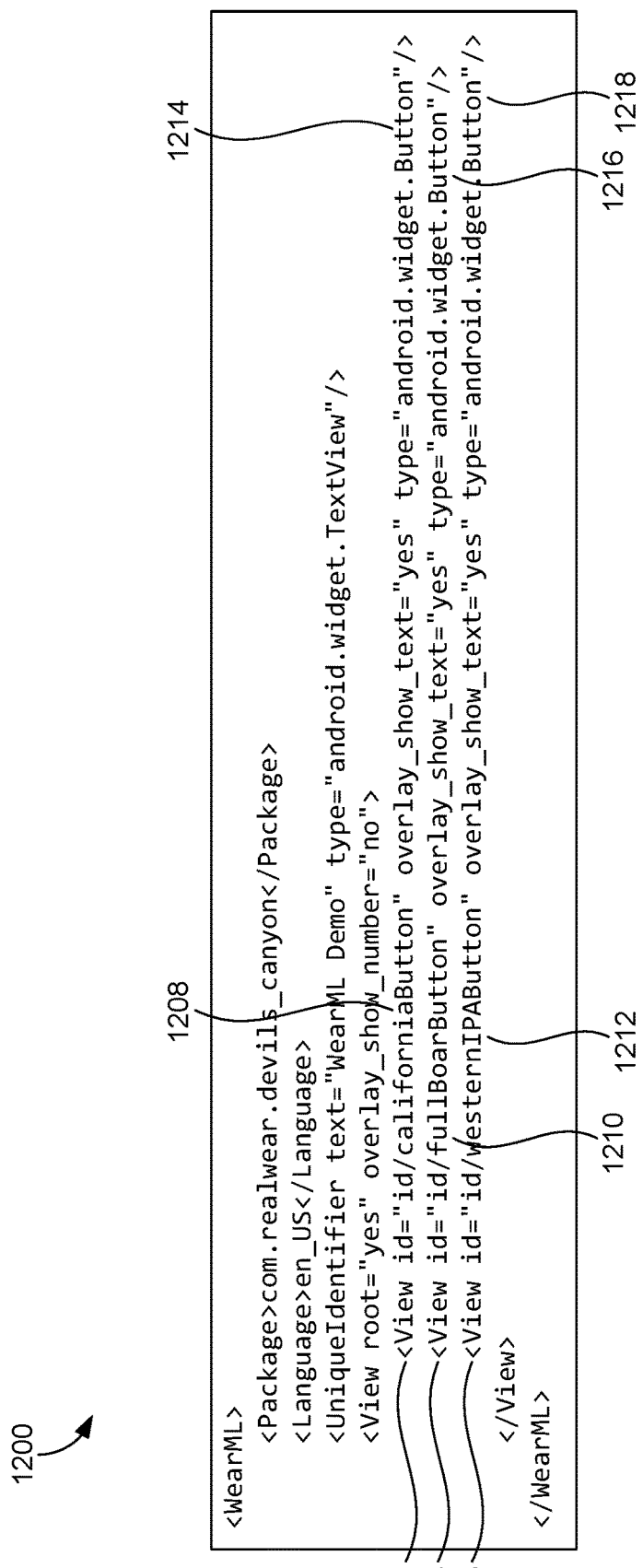
FIG. 12 depicts an exemplary user interface tree.

Turning now to FIG. 12, an exemplary user interface tree 1200 is provided showing exemplary instances of GUI element references 1202-1206. Each of the one or more GUI element references includes instructions to display a touch-interactive object 1214, 1216, and 1218. The user interface tree may also include information 1208-1212, that may be used to generate text-based user interface labels.

Figure 13A:
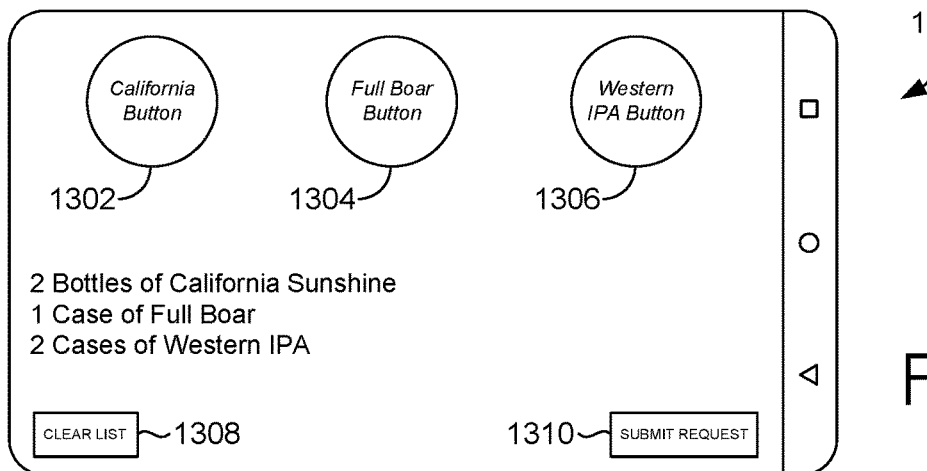
FIG. 13A depicts an exemplary touch-based interface of the user interface tree of FIG. 12.
Figure 13B:
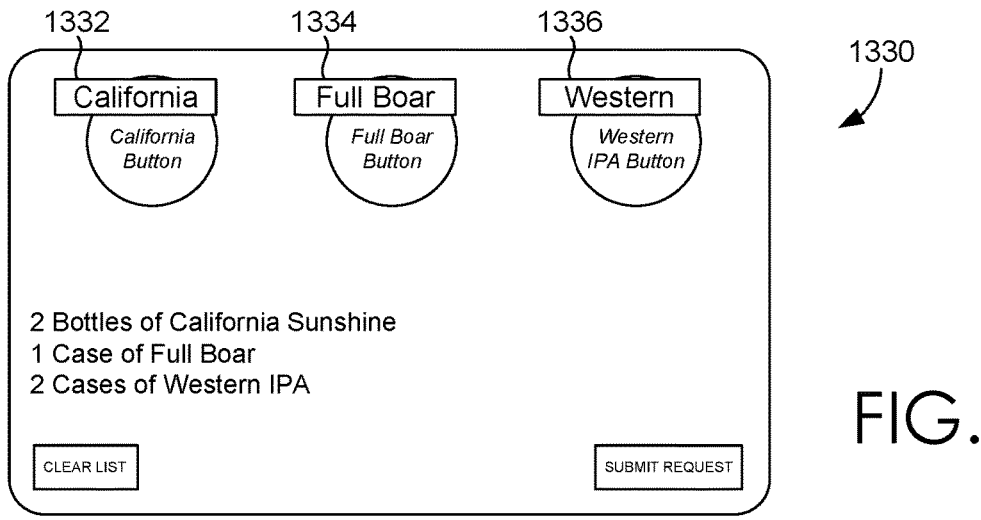
FIG. 13B depicts an exemplary text overlay of the touch-based interface of FIG. 13A associated with touch-based control dialogues in an exemplary user interface, in accordance with aspects hereof.
Figure 13C:
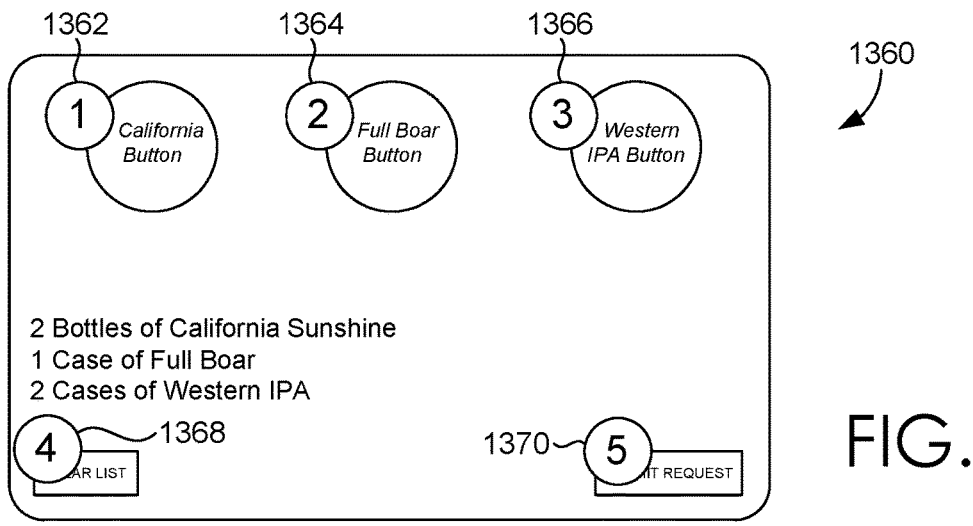
FIG. 13C depicts an exemplary numeric overlay of the touch-based interface of FIG. 13A associated with touch-based control dialogues in an exemplary user interface, in accordance with aspects hereof.

Turning now to FIG. 13A, an exemplary touch-based user interface 1300 is provided showing the display of exemplary instances of touch-interactive objects 1302-1310. By using conventional touch-based inputs, a user may interact with the touch-based user interface of the touch-based operating system to operate a touch-based application. The touch-based user interface 1300 may have limited or no ability to utilize non-touch-based inputs to operate the touch-based application.

Tuning now to FIG. 13B, a first exemplary hands-free user interface 1330 is provided showing exemplary instances of the display of text-based user interface labels 1132-1336. As discussed in relation to FIG. 11, the text-based user interface labels may be automatically generated and/or generated based on a customized index that includes a set of custom user interface labels. Unlike the touch-interactive objects 1302-1306 of FIG. 13A, a user may interact with the touch-based application by utilizing, for example, speech commands associated with the text-based user interface labels. As an example, the text-based user interface label 1332 correlates to the touch-interactive object 1302 of FIG. 13A

Turning now to FIG. 13C, a second exemplary hands-free user interface 1360 is provided showing exemplary instances of the display of numeral-based user interface labels 1362-1370. As discussed above, the numeral-based user interface labels may be automatically generated and/or generated based on a customized index that includes a set of custom user interface labels. Unlike the touch-interactive objects 1302-1306 of FIG. 13A, a user may interact with the touch-based application by utilizing, for example, speech commands associated with the numeral-based user interface labels. As an example, the numeral-based user interface label 1362 correlates to the touch-based interactive object 1302 of FIG. 13A.

In embodiments, multiple emulated touch inputs can be combined to form a single user interface label. Such an embodiment may comprise storing a history of emulated touch inputs. The emulated touch inputs may be received speech data or other hands-free inputs as disclosed herein. A sequence of two or more emulated touch inputs may exceed a threshold repetition value, indicating that the sequence is used sufficiently frequently. In such an instance, either the hands-free device and/or the touch-based operating system may modify the generated customized index to include a user interface label that corresponds to the particular sequence. Hands-free selection, for example by way of received speech data corresponding to a word or phrase included in the user interface label, of the user interface label that corresponds to the particular sequence may cause the touch-based application to carry out the operations associated with the two or more emulated touch inputs, in order.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility, may be employed without reference to other features and sub-combinations, and are contemplated within the scope of the claims.

What is claimed is:

1. A computer-implemented method for enabling hands-free operation of a binary touch-based application, the method comprising:
   detecting, by a computing device, a user interface tree generated by the binary touch-based application during initialization of the binary touch-based application, the binary touch-based application having a GUI with at least a GUI element;
   extracting, by the computing device, a reference that corresponds to the GUI element of the GUI from the user interface tree, the reference including a user interface label of the GUI element;
   determining, by the computing device, that the reference corresponding to the GUI element is associated with a customized user interface label, the customized user interface label being different than the user interface label of the GUI element and defined in a customized label index that is separate from the binary touch-based application, wherein the customized label index is user-defined to associate the customized user interface label with the reference;
   providing for display, by the computing device, an overlay adjacent to the GUI element based on the determination that the reference is associated with the customized user interface label within the customized label index, the overlay including the customized user interface label; and
   emulating, by the computing device, a touch input that corresponds to the GUI element based on a determination that an audio input corresponds to the customized user interface label.

2. The computer-implemented method of claim 1, wherein the overlay is selectively provided for display based on a determination that the customized user interface label is included in a customizable overlay template associated with the customized label index.

3. The computer-implemented method of claim 1, wherein the customized label index includes one of a XML file, a text file, or a database.

4. The computer-implemented method of claim 1, wherein the audio input is determined to correspond to the customized user interface label based on a conversion of the audio input into a keyword cue that matches the customized user interface label.

5. The computer-implemented method of claim 1, wherein the customized user interface label is displayed instead of the user interface label.

6. The computer-implemented method of claim 1, wherein the customized label index is user-defined after the user interface tree is detected.

7. The medium of claim 1, wherein the customized label index is user-defined after the user interface tree is detected.

8. A non-transitory computer storage medium storing computer-useable instructions that, when used by one or more computing devices, cause the one or more computing devices to perform operations comprising:
   detecting a user interface tree generated by a binary touch-based application during initialization of the binary touch-based application, the binary touch-based application having a GUI with at least a GUI element;
   extracting a reference that corresponds to the GUI element of the GUI from within the user interface tree, the reference including a user interface label of the GUI element;
   determining that the reference corresponding to the GUI element is associated with a customized user interface label, the customized user interface label being different than the user interface label of the GUI element and defined in a customized label index that is separate from the binary touch-based application, wherein the customized label index is user-defined to associate the customized user interface label with the reference;
   providing for display an overlay adjacent to the GUI element based on the determination that the reference is associated with the customized user interface label within the customized label index, the overlay including the customized user interface label; and
   emulating a touch input that corresponds to the GUI element based on a determination that an audio input corresponds to the customized user interface label.

9. The media of claim 8, wherein the overlay is selectively provided for display based on a determination that the customized user interface label is included in a customizable overlay template associated with the binary touch-based application.

10. The media of claim 8, wherein the customized label index includes one of a XML file, a text file, or a database.

11. The media of claim 8, wherein the audio input is determined to correspond to the customized user interface label based on a conversion of the audio input into a keyword cue that matches the customized user interface label.

12. The medium of claim 8, wherein the customized user interface label is displayed instead of the user interface label.

13. A system for enabling hands-free operation of a binary touch-based application, the system comprising:
   one or more processors; and
   one or more computer storage media storing computer-useable instructions that, when executed by the one or more processors, implement a method comprising:
      detect a user interface tree generated by the binary touch-based application during initialization of the binary touch-based application, the binary touch-based application having a GUI with at least a GUI element;
      extract a reference that corresponds to the GUI element of the GUI from the user interface tree, the reference including a user interface label of the GUI element;
      determine that the reference corresponding to the GUI element is associated with a customized user interface label, the customized user interface label being different than the user interface label of the GUI element and being user-defined within a label index that is customized based on the user interface tree;
      provide for display an overlay adjacent to the GUI element, the overlay including the customized user interface label based on the determination that the reference is associated with the customized user interface label within the customized label index; and
      emulate a touch input that corresponds to the GUI element based on a determination that an audio input corresponds to the customized user interface label.

14. The system of claim 13, wherein the overlay is selectively provided for display based on a determination that the customized user interface label is included in a customizable overlay template associated with the binary touch-based application.

15. The system of claim 13, wherein the customized user interface label is displayed instead of the user interface label.

16. The system of claim 13, wherein the customized label index is user-defined after the user interface tree is detected.

* * * * *